(12) United States Patent
Betrisey et al.

(10) Patent No.: US 6,282,327 B1
(45) Date of Patent: Aug. 28, 2001

(54) MAINTAINING ADVANCE WIDTHS OF EXISTING CHARACTERS THAT HAVE BEEN RESOLUTION ENHANCED

(75) Inventors: Claude Betrisey, Redmond; Bodin Dresevic, Bellevue, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/364,364

(22) Filed: Jul. 30, 1999

(51) Int. Cl.$^7$ .................................................. G06K 9/32
(52) U.S. Cl. .................. 382/299; 382/203; 382/256; 345/469; 345/472
(58) Field of Search .......................... 382/199, 201–203, 382/256, 258–259, 298–299; 345/144, 467–469, 472; 707/518–519, 531

(56) References Cited

U.S. PATENT DOCUMENTS

| | | | |
|---|---|---|---|
| 4,136,359 | 1/1979 | Wozniak | 358/17 |
| 4,217,604 | 8/1980 | Wozniak | 358/16 |
| 4,278,972 | 7/1981 | Wozniak | 340/703 |
| 5,050,229 | * 9/1991 | Barski et al. | 382/259 |
| 5,057,739 | 10/1991 | Shimada et al. | 313/477 R |
| 5,122,783 | 6/1992 | Bassetti, Jr. | 340/701 |
| 5,254,982 | 10/1993 | Feigenblatt et al. | 345/148 |
| 5,298,915 | 3/1994 | Bassetti, Jr. et al. | 345/149 |
| 5,334,996 | 8/1994 | Tanigaki et al. | 345/152 |
| 5,341,153 | 8/1994 | Benzschawel et al. | 345/152 |
| 5,349,451 | 9/1994 | Dethardt | 358/518 |
| 5,467,102 | 11/1995 | Kuno et al. | 345/1 |
| 5,509,091 | * 4/1996 | Aoki | 382/298 |
| 5,543,819 | 8/1996 | Farwell et al. | 345/150 |
| 5,548,305 | 8/1996 | Rupel | 345/150 |
| 5,555,360 | 9/1996 | Kumazaki et al. | 395/143 |
| 5,586,241 | * 12/1996 | Bauermeister et al. | 345/467 |
| 5,633,654 | 5/1997 | Kennedy, Jr. et al. | 345/114 |
| 5,689,283 | 11/1997 | Shirochi | 345/132 |
| 5,740,456 | * 4/1998 | Harel et al. | 707/518 |
| 5,767,837 | 6/1998 | Hara | 345/152 |
| 5,768,490 | * 6/1998 | Hersch et al. | 345/468 |
| 5,796,409 | * 8/1998 | Hersch et al. | 345/468 |
| 5,821,913 | 10/1998 | Mamiya | 345/88 |
| 5,847,698 | 12/1998 | Reavey et al. | 345/173 |
| 5,857,067 | * 1/1999 | Hasset et al. | 345/144 |
| 5,894,300 | 4/1999 | Takizawa | 345/115 |
| 5,949,643 | 9/1999 | Batio | 361/681 |
| 5,963,185 | 10/1999 | Havel | 345/83 |
| 6,026,185 | * 2/2000 | Kujirai | 382/199 |

OTHER PUBLICATIONS

Abram, G. et al. "Efficient Alias–free Rendering using Bit–masks and Look–Up Tables" *San Francisco*, vol. 19, No. 3, 1985 (pp. 53–59).

Ahumada, A.J. et al. "43.1: A Simple Vision Model for Inhomogeneous Image–Quality Assessment" *1998 SID*.

Barbier, B. "25.1: Multi–Scale Filtering for Image Quality on LCD Matrix Displays" *SID 96 Digest*.

Barten, P.G.J. "P–8: Effect of Gamma on Subjective Image Quality" *SID 96 Digest*.

(List continued on next page.)

Primary Examiner—Matthew C. Bella
Assistant Examiner—Gregory Desire
(74) Attorney, Agent, or Firm—Workman, Nydegger & Seeley

(57) ABSTRACT

The widths of characters, that have had (or that are having) resolution enhancement processing applied, are adjusted so that the widths of the characters are maintained. In this way, formatting of any file including such characters is maintained. Specifically, the advance width of each character may be adjusted. A non-uniformity of gaps between characters may be minimized by adjusting the left and/or right side bearing of each character. Finally, a non-uniformity in the weight of character lines may be minimized by adjusting the black body width of each character.

23 Claims, 24 Drawing Sheets

OTHER PUBLICATIONS

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer–Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually––tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cutting Edge Display Technology—The Diamond Vision Difference" www.amasis.com/diamondvision/technical.html, Jan. 12, 1999.

"Exploring the Effect of Layout on Reading from Screen" http://fontweb/internal/repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize, Jun. 30, 1997.

"TrueType fundamentals" http://www.microsoft.com/OTSPEC/TTCHO1.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

MAINTAINING ADVANCE WIDTHS OF EXISTING CHARACTERS THAT HAVE BEEN RESOLUTION ENHANCED

§ 1. BACKGROUND OF THE INVENTION

§ 1.1 Field of the Invention

The present invention concerns techniques for enhancing the resolution of characters, such as fonts for example, to be rendered on a patterned output device, such as a flat panel video monitor or an LCD video monitor for example. More specifically, the present invention concerns techniques for maintaining the width of fonts, and related challenges, so that existing formatting remains unchanged when the resolution of characters is enhanced. The present invention also concerns minimizing visually annoying variations in spacing and line weight.

§ 1.2 Related Art

Before an introduction of related art, it must be understood that the related art described here is not necessarily "prior art" and that the description of such related art in this section is not to be construed as an admission that the art is "prior art", unless expressly stated.

The present invention may be used in the context of patterned output devices such as flat panel video monitors, or LCD video monitors for example. In particular, the present invention may be used as a part of processing to produce higher resolution characters, such as text for example, on patterned displays, such as LCD video monitors for example. Although the structure and operation of display devices in general, and patterned display devices, such as LCD monitors for example, in particular, are known by those skilled in the art, they are discussed in § 1.2.1 below for the reader's convenience. Then, known ways of rendering characters on such displays are discussed in § 1.2.2 below.

§ 1.2.1 Display Devices

Color display devices have become the principal display devices of choice for most computer users. Color is typically displayed on a monitor by operating the display device to emit light (such as a combination of red, green, and blue light for example) which results in one or more colors being perceived by the human eye.

Although color video monitors in general, and LCD video monitors in particular, are known to those skilled in the art, they are introduced below for the reader's convenience. In § 1.2.1.1 below, cathode ray tube (or CRT) video monitors are first introduced. Then, in § 1.2.1.2 below, LCD video monitors are introduced.

§ 1.2.1.1 CRT Video Monitors

Cathode ray tube (CRT) display devices include phosphor coatings which may be applied as dots in a sequence on the screen of the CRT. A different phosphor coating is normally associated with the generation of different colors, such as red, green, and blue for example. Consequently, repeated sequences of phosphor dots are defined on the screen of the video monitor. When a phosphor dot is excited by a beam of electrons, it will generate its associated color, such as red, green and blue for example.

The term "pixel" is commonly used to refer to one spot in a group of spots, such as rectangular grid of thousands of such spots for example. The spots are selectively activated to form an image on the display device. In most color CRTs, a single triad of red, green and blue phosphor dots cannot be uniquely selected. Consequently, the smallest possible pixel size will depend on the focus, alignment and bandwidth of the electron guns used to excite the phosphor dots. The light emitted from one or more triads of red, green and blue phosphor dots, in various arrangements known for CRT displays, tend to blend together giving, at a distance, the appearance of a single colored light source.

In color displays, the intensity of the light emitted from the additive primary colors (such as red, green, and blue) can be varied to achieve the appearance of almost any desired color pixel. Adding no color, i.e., emitting no light, produces a black pixel. Adding 100 percent of all three (3) colors produces a white pixel.

Having introduced color CRT video monitors, color LCD video monitors are now introduced in § 1.2.1.2 below.

§ 1.2.1.2 LCD Video Monitors

Portable computing devices (also referred to generally as computing appliances or untethered computing appliances) often use liquid crystal displays (LCDs) or other flat panel display devices, instead of CRT displays. This is because flat panel displays tend to be smaller and lighter than CRT displays. In addition, flat panel displays are well suited for battery powered applications since they typically consume less power than comparably sized CRT displays. Further, LCD flat panel monitors are even becoming more popular in the desktop computing environment.

Color LCD displays are examples of display devices which distinctly address elements (referred to herein as pixel sub-components, pixel sub-elements, or simply, emitters) to represent each pixel of an image being displayed. Normally, each pixel element of a color LCD display includes three (3) non-square elements. More specifically, each pixel element may include adjacent red, green and blue (RGB) pixel sub-components. Thus, a set of RGB pixel sub-components together may define a single pixel element.

Known LCD displays generally include a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB vertical stripes. Naturally, however, some LCD monitors may have RGB horizontal stripes.

FIG. 1 illustrates a known LCD screen 100 comprising pixels arranged in a plurality of rows (R1–R12) and columns (C1–C16). That is, a pixel is defined at each row-column intersection. Each pixel includes a red pixel sub-component, depicted with moderate stippling, a green component, depicted with dense stippling, and a blue component, depicted with sparse stippling. FIG. 2 illustrates the upper left hand portion of the known display 100 in greater detail. Note how each pixel element, such as, the (R2, C4) pixel element for example, comprises three (3) distinct sub-element or sub-components; a red sub-component 206, a green sub-component 207 and a blue sub-component 208. In the exemplary display illustrated, each known pixel sub-component 206, 207, 208 is ⅓, or approximately ⅓, the width of a pixel while being equal, or approximately equal, in height to the height of a pixel. Thus, when combined, the three ⅓ width, full height, pixel sub-components 206, 207, 208 define a single pixel element.

As illustrated in FIG. 1, one known arrangement of RGB pixel sub-components 206, 207, 208 form what appear to be vertical color stripes on the display 100. Accordingly, the arrangement of ⅓ width color sub-components 206, 207, 208, in the known manner illustrated in FIGS. 1 and 2, exhibit what is sometimes called "vertical striping".

In known systems, the RGB pixel sub-components are generally used as a group to generate a single colored pixel corresponding to a single sample of the image to be represented. More specifically, in known systems, luminous intensity values for all the pixel sub-components of a pixel element are generated from a single sample of the image to be rendered.

Having introduced the general structure and operation of known LCD displays, known techniques for rendering text on such LCD displays, as well as perceived shortcomings of such known techniques, are introduced in §1.2.2 below.

§ 1.2.2 Rendering Text on Displays

The expression of textual information using font sets is introduced in § 1.2.2.1 below. Then, the rendering of textual information using so-called pixel precision and perceived shortcomings of doing so are introduced in § 1.2.2.2 below.

§ 1.2.2.1. Font Sets

A "font" is a set of characters of the same typeface (such as Times Roman, Courier New, etc.), the same style (such as italic), the same weight (such as bold and, strictly speaking, the same size). Characters may include symbols, such as the "Parties MT", "Webdings", and "Wingdings" symbol groups found on the Word™ word processor from Microsoft Corporation of Redmond, Washington for example. A "typeface" is a specific named design of a set of printed characters (e.g., Helvetica Bold Oblique), that has a specified obliqueness (i.e., degree of slant) and stoke weight (i.e., line thickness). Strictly speaking, a typeface is not the same as a font, which is a specific size of a specific typeface (such as 12-point Helvetica Bold Oblique). However, since some fonts are "scalable", the terms "font" and "typeface" may sometimes be used interchangeably. A "typeface family" is a group of related typefaces. For example, the Helvetica family may include Helvetica, Helvetica Bold, Helvetica Oblique and Helvetica Bold Oblique.

Many modern computer systems use font outline technology, such as scalable fonts for example, to facilitate the rendering and display of text. TrueType™ fonts from Microsoft Corporation of Redmond, Washington are an example of such technology. In such systems, various font sets, such as "Times New Roman," "Onyx," "Courier New," etc. for example, may be provided. The font set normally includes a high resolution outline representation, such as a series of contours for example, for each character which may be displayed using the provided font set. The contours may be straight lines or curves for example. Curves may defined by a series of points that describe second order Bezier-splines for example. The points defining a curve are typically numbered in consecutive order. The ordering of the points may be important. For example, the character outline may be "filled" to the right of curves when the curves are followed in the direction of increasing point numbers. Thus the high resolution character outline representation may be defined by a set of points and mathematical formulas.

The point locations may be described in "font units" for example. A "font unit" may be defined as the smallest measurable unit in an "em" square, which is an imaginary square that is used to size and align glyphs (a "glyph" can be thought of as a character). FIG. 3 illustrates an "em" square 310 around a character outline 320 of the letter Q. Historically, an "em" was approximately equal to the width of a capital M. Further, historically, glyphs could not extend beyond the em square. More generally, however, the dimensions of an "em" square are those of the full body height 340 of a font plus some extra spacing. This extra spacing was provided to prevent lines of text from colliding when typeset without extra leading was used. Further, in general, portions of glyphs can extend outside of the em square. The coordinates of the points defining the lines and curves (or contours) may be positioned relative to a baseline 330 (Y coordinate= 0). The portion of the character outline 320 above the baseline 330 is referred to as the "ascent" 342 of the glyph. The portion of the character outline 320 below the baseline 330 is referred to as the "descent" 344 of the glyph. Note that in some languages, such as Japanese for example, the characters sit on the baseline, with no portion of the character extending below the baseline. Each character includes two (2) points on its baseline 330—the character origin (or "CO") 332 and the concatenation point (or "CP") 334. The concatenation point 334 of one character will coincide with the character origin point 332 of a next adjacent character. The distance between the character origin 332 and the concatenation point 334 is referred to as the advance width (or "AW") 370. The stored outline character representation normally does not represent space beyond the maximum horizontal and vertical boundaries of the character (also referred to as "white space" or "side bearings"). Therefore, the stored character outline portion of a character font is often referred to as a black body (or "BB"). The width 380 of the character outline 320 is referred to as the black body width (or "BBW"). The width 392 of the space between the character origin 332 and the left side boundary of the character outline 320 is referred to as the left side bearing (or "LSB"). Similarly, the width 394 of the space between the concatenation point 334 and the right side boundary of the character outline 320 is referred to as the right side bearing (or "RSB"). Notice that the sum of the black body width 380, left side bearing 392 and right side bearing 394 is the same as the advance width 370.

A font generator is a program for transforming character outlines into bitmaps of the style and size required by an application. Font generators (also referred to as "rasterizers") typically operate by scaling a character outline to a requested size and can often expand or compress the characters that they generate to improve readability (referred to as "hinting" which is described in more detail below). Note that the left and right side bearings may have zero (0) or negative values. Note also that in characters used in Japanese and other Far Eastern languages, metrics analogous to advance width, left side bearing and right side bearing—namely, advance height (AH), top side bearing (TSB) and bottom side bearing (BSB) —may be used.

§ 1.2.2.2 Rendering Text to Pixel Precision

In the following, known techniques for rendering text on an output device such as a display (or printer) is described in § 1.2.2.2.1. Then, an example illustrating round-off errors which may occur when using such known techniques is described in § 1.2.2.2.2.

§ 1.2.2.2.1 Technique for Rendering Text

FIG. 4 is a high level diagram of processes that may be performed when an application requests that text be rendered on a display device. Basically, as will be described in more detail below, text may be rendered by: (i) loading a font and supplying it to a rasterizer; (ii) scaling the font outline based on the requested point size and the resolution of the display device; (iii) applying hints to the outline; (iv) filling the grid fitted outline with pixels to generate a raster bitmap; (v) scanning for dropouts (optional); (vi) caching the raster bitmap; and (vii) transferring the raster bitmap to the display device.

In the case of scaling fonts, the font unit coordinates used to define the position of points defining contours of a character outline are scaled to device specific pixel coordinates. That is, when the resolution of the em square is used to define a character outline, before that character can be displayed, it must be scaled to reflect the size, transformation and the characteristics of the output device on which it is to be rendered. The scaled outline describes the character outline in units that reflect the absolute unit of measurement used to measure pixels of the output device, rather than the relative system of measurement of font units per em. Specifically, with known techniques, values in the em square are converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \quad (1)$$

where the character outline size is in font uints, and output device resolution is in pixels/inch.

The resolution of the output device may be specified by the number of dots or pixels per inch (dpi). For example, a VGA video monitor may be treated as a 96 dpi device, a laser printer may be treated as a 300 dpi device, an EGA video monitor may be treated as a 96 dpi device in the horizontal (X) direction, but a 72 dpi device in the vertical (Y) direction. The font units per em may (but need not) be chosen to be a power of two (2), such as 2048 (=211) for example.

FIG. 4 is a high level diagram of processes which may be performed by a known text rendering system. As shown in FIG. 4, an application process 410, such as a word processor or contact manager for example, may request that text be displayed and may specify a point size for the text. Although not shown in FIG. 4, the application process 410 may also request a font name, background and foreground colors and an absolute or relative screen location at which the text is to be rendered. The text and, if applicable, the point size, 412 are provided to a graphics display interface (or GDI) process (or more generally, a graphics display interface) 422. The GDI process 422 uses display information 424 (which may include such display resolution information as pixels per inch on the display) and character information 425 (which may be a character outline information which may be represented as points defining a sequence of contours such as lines and curves, advance width information and left side bearing information) to generate glyphs (or to access cached glyphs which have already been generated). Glyphs may include a bitmap of a scaled character outline (or a bounding box 360 containing black body 320 information), advance width 370 information, and left side bearing 392 information. Each of the bits of the bitmap may have associated red, green and blue luminous intensity values. The graphics display interface process 422 is described in more detail in § 1.2.2.2.1.1 below. The graphics display interface process 422, the display information 424, and the glyph cache 426 may be a part of, and effected by, an operating system, such as the Windows® CE or Windows NT® operating systems (from Microsoft Corporation of Redmond, Wash.) for example.

Glyphs (also referred to as digital font representations) 428' or 428, either from the glyph cache 426 or from the graphics display interface process 422, are then provided to a display driver management process (or more generally, a display driver manager) 435. The display driver management process 435 may be a part of a display (or video) driver 430. Typically, a display driver 430 may be software which permits a computer operating system to communicate with a particular video display. Basically, the display driver management process 435 may invoke a color palette selection process 438. These processes 435 and 438 serve to convert the character glyph information into the actual pixel intensity values. The display driver management process 435 receives, as input, glyphs and display information 424'. The display information 424' may include, for example, foreground/background color information, color palette information and pixel value format information.

The processed pixel values may then be forwarded as video frame part(s) 440 along with screen (and perhaps window) positioning information (e.g., from the application process 410 and/or operating system), to a display (video) adapter 450. A display adapter 450 may include electronic components that generate a video signal sent to the display 460. A frame buffer process 452 may be used to store the received video frame part(s) in a screen frame buffer 454 of the display adapter 450. Using the screen frame buffer 454 allows a single image of, e.g., a text string, to be generated from glyphs representing several different characters. The video frame(s) from the screen frame buffer 454 is then provided to a display adaptation process 453 which adapts the video for a particular display device. The display adaptation process 458 may also be effected by the display adapter 450.

Finally, the adapted video is presented to the display device 460, such as an LCD display for example, for rendering.

Having provided an overview of a text rendering system, the graphics display interface process 422 is now described in more detail in § 1.2.2.2.1.1 below. The processes which may be performed by the display driver are then described in more detail in § 1.2.2.2.1.2 below.

§ 1.2.2.2.1.1 Graphics Display Interface

FIG. 5 illustrates processes that may be performed by a graphics display interface (or GDI) process 422, as well as data that may be used by the GDI process 422. As shown in FIG. 5, the GDI process 422 may include a glyph cache management process (or more generally, a glyph cache manager) 510 which accepts text, or more specifically, requests to display text, 412. The request may include the point size of the text. The glyph cache management process 510 forwards this request to the glyph cache 426. If the glyph cache 426 includes the glyph corresponding to the requested text character, it provides it for downstream processing. If, on the other hand, the glyph cache 426 does not have the glyph corresponding to the requested text character, it so informs the glyph cache management process 510 which, in turn, submits a request to generate the needed glyph to the type rasterization process (or more generally, a type rasterizer) 520. Basically, a type rasterization process 520 may be effected by hardware and/or software and converts a character outline (which may, recall, include points which define contours such as lines and curves based on mathematical formulas) into a raster (that is, a bitmapped) image. Each pixel of the bitmap image may have a color value and a brightness for example. A type rasterization process is described in § 1.2.2.2.1.1.1 below.

§ 1.2.2.2.1.1.1 Rasterizer

To reiterate, the type rasterization process 520 basically transforms character outlines into bitmapped images. The scale of the bitmap may be based on the point size of the font and the resolution (e.g., pixels per inch) of the display device 460. The text, font, and point size information may be obtained from the application 410, while the resolution of the display device 460 may be obtained from a system configuration or display driver file or from monitor settings stored in memory by the operating system. The display information 424 may also include foreground/background color information, gamma values, color palette information and/or display adapter/display device pixel value format information. To reiterate, this information may be provided from the graphics display interface 422 in response to a request from the application process 410. If, however, the background of the text requested is to be transparent (as opposed to opaque), the background color information is what is being rendered on the display (such as a bitmap image or other text for example) and is provided from the display device 460 or the video frame buffer 454.

Basically, the rasterization process may include two (2) or three (3) sub-steps or sub-processes. First, the character outline is scaled using a scaling process (or more generally, a scaling facility) 522. This process is described below. Next, the scaled image generated by the scaling process 522 may be placed on a grid and have portions extended or shrunk using a hinting process (or more generally, a hinting facility) 526. This process is also described below. Then, an outline fill process (or more generally, an outline fill facility) 528 is used to fill the grid-fitted outline to generate a raster bitmap. This process is also described below.

When scaling fonts in conventional systems such as TrueType™ from Microsoft Corporation of Redmond, Wash., the font unit coordinates used to define the position of points defining contours of a character outline were scaled to device specific pixel coordinates. That is, since the resolution of the em square was used to define a character outline, before that character could be displayed, it was scaled to reflect the size, transformation and the characteristics of the output device on which it was to be rendered. Recall that the scaled outline describes the character outline in units that reflect the absolute unit of measurement used to measure pixels of the output device, rather than the relative system of measurement of font units per em. Thus, recall that values in the em square were converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \quad (1)$$

where the character outline size is in font uints, and output device resolution is in pixels/inch.

Recall that the resolution of an output device may be specified by the number of dots or pixels per inch (dpi).

The purpose of hinting (also referred to as "instructing a glyph") is to ensure that critical characteristics of the original font design are preserved when the glyph is rendered at different sizes and on different devices. Consistent stem weights, consistent "color" (that is, in this context, the balance of black and white on a page or screen), even spacing, and avoiding pixel dropout are common goals of hinting. In the past, uninstructed, or unhinted, fonts would generally produce good quality results at sufficiently high resolutions and point sizes. However, for many fonts, legibility may become compromised at smaller point sizes on lower resolution displays. For example, at low resolutions, with few pixels available to describe the character shapes, features such as stem weights, crossbar widths and serif details can become irregular, or inconsistent, or even missed completely.

Basically, hinting may involve "grid placement" and "grid fitting". Grid placement is used to align a scaled character within a grid, that is used by a subsequent outline fill process 528, in a manner intended to optimize the accurate display of the character using the available sub-pixel elements. Grid fitting involves distorting character outlines so that the character better conforms to the shape of the grid. Therefore, hinting can change the advance width 370 of a font. Grid fitting ensures that certain features of the glyphs are regularized. Since the outlines are usually distorted at only a specified number of smaller sizes, the contours of the fonts at high resolutions usually remain unchanged and undistorted.

In grid placement, sub-pixel element boundaries may be treated as boundaries along which characters can, and should, be aligned or boundaries to which the outline of a character should be adjusted.

Other known hinting instructions may also be carried out on the scaled character outline. FIG. 6 illustrates an unhinted letter "w". Notice that the font is asymmetric and that some of the details of the slanted line are lost. FIG. 7 illustrates the letter "w" after hinting instructions have been applied. In this case, the advance width 370 has been enlarged by two (2) pixels.

In an implementation of anti-aliased text for TrueType™ fonts supported in Windows NT™ 4, the hinted image 627 is overscaled four (4) times in both the X and Y directions. The image is then sampled. More specifically, for every physical pixel, which is represented by 4×4 portion of the grid in an overscaled image, the blend factor alpha for that pixel is determined by simply counting the squares whose centers lie within the glyph outline and dividing the result by 16. As a result, foreground/background blend factor alpha is expressed as k/16 and is computed for every pixel. This whole process is also called standard anti-aliasing filtering. Unfortunately, however, such standard anti-aliasing tends to blur the image. Similar implementation exists in Windows 95 and Windows 98, and the only difference is that the image is overscaled two (2) times in both X and Y, so that alpha for every pixel is expressed as k/4, where k is a number of squares within the glyph outline.

The outline fill process 528 basically determines whether the center of each pixel is enclosed within the character outline 320. If the center of a pixel is enclosed within the character outline 320, that pixel is turned ON. Otherwise, the pixel is left OFF. The problem of "pixel dropout" may occur whenever a connected region of a glyph interior contains two (2) ON pixels that cannot be connected by a straight line that passes through only those ON pixels. Pixel dropout may be overcome by looking at an imaginary line segment connected two (2) adjacent pixel centers, determining whether the line segment is intersected by both an on-transition contour and off-transition contour, determining whether the two (2) contour lines continue in both directions to cut other line segments between adjacent pixel centers and, if so, turning pixels ON.

The rasterized glyphs are then cached in glyph cache 426. Caching glyphs is useful. More specifically, since most Latin fonts have only about 200 characters, a reasonably sized cache makes the speed of the rasterizer almost meaningless. This is because the rasterizer runs once, for example when a new font or point size is selected. Then, the bitmaps are transferred out of the glyph cache 426 as needed.

The scaling process 522 of the known system just described may introduce certain rounding errors. Constraints are enforced by (i) scaling the size and positioning information included in a character font as a function of the point size and device resolution as just described above, and (ii) then rounding the size and positioning values to integer multiples of the pixel size used in the particular display device. Using pixel size units as the minimum (or "atomic") distance unit produces what is called "pixel precision" since the values are accurate to the size of one (1) pixel.

Rounding size and positioning values of character fonts to pixel precision introduces changes, or errors, into displayed images. Each of these errors may be up to ½ a pixel in size (assuming that values less than ½ a pixel are rounded down and values greater than or equal to ½ a pixel are rounded up). Thus, the overall width of a character may be less precise than desired since the character's advance width 370 is (may be) rounded. In addition, the positioning of a character's black body within the total horizontal space allocated to that character may be sub-optimal since the left side bearing 392 is (may be) rounded. At small point sizes, the changes introduced by rounding using pixel precision can be significant.

§ 1.2.2.3 Rendering Text to Sub-Pixel Precision: Resolution Enhancement

FIG. 8 is a high level diagram of processes that may be performed to enhance the resolution of characters, such as fonts, as well as data accepted by or generated by such processes. As shown, the processes may act on an analytic image 412/425, such as contours, and foreground and background colors of a character.

An overscaling or oversampling process (or more generally, overscaling facility) 522'/710' may accept analytic character information, such as contours for example, and a scale factor or grid 820 and overscale and/or oversample the analytic character information. In this context, given an analytic character outline arranged on a grid defined by a coordinate system, overscaling means stretching the analytic character outline while leaving the coordinate system unchanged, while oversampling means compressing the grid defined by the coordinate system while leaving the analytic character outline unchanged. In the first case, in which the analytic character outline is overscaled, an overscaled analytic image 805 is generated. The overscaled analytic image 805 may then be sampled by sampling process (or more generally, a sampler) 806 to generate ultra-resolution digital image information 810. In the second case, in which the analytic character outline (which may have been overscaled) is oversampled, the ultra-resolution digital image information 810 is generated directly. The ultra-resolution image 810 has a higher resolution than the display 460 upon which the character is to be rendered. In one example, if the display is a RGB striped LCD monitor for example, the ultra-resolution image may have a resolution corresponding to the sub-pixel component resolution of the display, or an integer multiple thereof. For example, if a vertically striped RGB LCD monitor is to be used, the ultra-resolution image 810 may have a pixel resolution in the Y direction and a ⅓ (or ⅓N, where N is an integer) pixel resolution in the X direction. If, on the other hand, a horizontally striped RGB LCD monitor is to be used, the ultra-resolution image 810 may have a pixel resolution in the X direction and a ⅓ (or ⅓N) pixel resolution in the Y direction.

The optional hinting process (or more generally, a hinting facility) 526' may apply hinting instructions to the overscaled analytic image 805. In one embodiment, the overscaling and/or oversampling process 522' overscales the analytic image 415/425 by a factor of an arbitrarily large number N (e.g., N=sixteen (16)) in the X direction and does not scale the analytic image 415/425 in the Y direction. By doing this, in many cases, the hinting instructions of the optional hinting process 526' will not cause problems in the X direction (e.g., change the advance width of the character), which might otherwise occur. In this embodiment, the downscaling process 807 actually downscales the hinted image by Z/N, where Z is the number of samples per sub-pixel element desired (e.g., Z/N=6/16). The resulting scaled analytic image 808 is then sampled by sampling process 806. Consequently, the resulting ultra-resolution digital image information 810 is oversampled by Z (e.g., six (6)) in the X direction. That is, there may be Z (e.g., six (6)) samples per pixel or Z/3 (e.g., two (2)) samples per sub-pixel component.

FIG. 9 illustrates an example of the operation of an exemplary overscaling/oversampling process 522'/710' used in the case of a vertically striped LCD monitor. First, font vector graphics (e.g., the character outline), point size and display resolution are accepted. This information is denoted 412/425/910 in FIG. 9. The font vector graphics (e.g., the character outline) 412/425/910 is rasterized based on the point size, display resolution and the overscale factors (or oversample rate). As shown in the example of FIG. 9, the Y coordinate values of the character outline (in units of font units) are scaled as shown in 920 and rounded to the nearest integer pixel value. On the other hand, the X coordinate values of the character outline (in units of font units) are overscaled as shown in 930 and rounded to the nearest integer scan conversion source sample (e.g., pixel subcomponent) value. Further, horizontal (or X) glyph metrics, such as advance width, left side bearing and right side bearing, are also overscaled as shown in 930 and rounded to the nearest integer scan conversion source sample (e.g., pixel sub-component) value. The resulting data 940 is the character outline in units of pixels in the Y direction and units of scan conversion source samples (e.g., pixel subcomponents) in the X direction.

Then, referring back to FIG. 8, a process 830 for combining displaced (e.g., adjacent, spaces, or overlapping) samples (or more generally, a filtering facility) of the ultra-resolution image 524' can be used to generate another ultra-resolution image 840 (or an image with sub-pixel information) which may then be cached into cache storage 880 by the optional caching process 870. Each sample of the ultra-resolution image 840 may be based on the same number or differing numbers of samples from the ultra-resolution image 810. The cached character information 870 may then be accessed by a compositing process 850 which uses the foreground and background color information 424'.

Having described processes which may be used to perform an exemplary resolution enhancement function, special formatting concerns are now addressed in § 1.2.2.3.1 below.

§ 1.2.2.3.1 Maintaining Formatting

Recall that the optional hinting process 526' may be applied to the overscaled analytic image 805. FIG. 10 illustrates a resolution enhanced character, with hinting, if any, applied. Comparing FIG. 10 with FIG. 7, notice that the black body width 380 has changed. Although not shown, the advance width 370, denoted by point "20", has also changed. (Recall FIG. 9.) Character widths are important when laying out text—changing the width of a character for a given font and point size may disturb formatting in existing documents. Changing the width of a character for a given font and point size may also disturb text within "dialog boxes", such that a message or words in a dialog box, or button, may shrink, become off-center, or extend outside of the dialog box or button. This presents an important challenge. Resolution enhancement techniques that have been developed, or that are being developed, promise significant advances in the readability of characters rendered on patterned displays. Such resolution enhancement techniques are particularly important when fonts with small point sizes are used, which is becoming more and more common given the increased use and acceptance of smaller, compact, untethered computing devices or information appliances. However, the formatting of resolution enhanced text should be backwards compatible. That is, text that was formatted with standard typographic techniques should maintain its formatting when enhanced resolution typographic techniques are used.

§ 1.2.3 Unmet Needs

In view of the errors introduced when rounding character values, line drawings, or high resolution or analytic graphics to pixel precision as introduced above, methods and apparatus to increase the legibility and perceived quality of text are needed. Such methods and apparatus should maintain the formatting of text generated using standard typographic techniques and/or existing text processing applications. Such methods and apparatus should also minimize or eliminate any readily perceptible or annoying variations in character spacing and character line weight.

§ 2. SUMMARY OF THE INVENTION

The present invention adjusts the widths of characters, that have had (or that are having) resolution enhancement processing applied, so that the widths of the characters are maintained. In this way, formatting of any text including such resolution enhanced characters is maintained. The present invention does so by adjusting the advance width of each character. The present invention may also minimize a non-uniformity of gaps between characters. The present invention may do so by adjusting the left and/or right side bearing of each character. Finally, the present invention may minimize a non-uniformity in the weight of character lines. The present invention may do so by adjusting the black body width of each character.

§ 3. BRIEF DESCRIPTION OF THE DRAWINGS

Figure 26A:
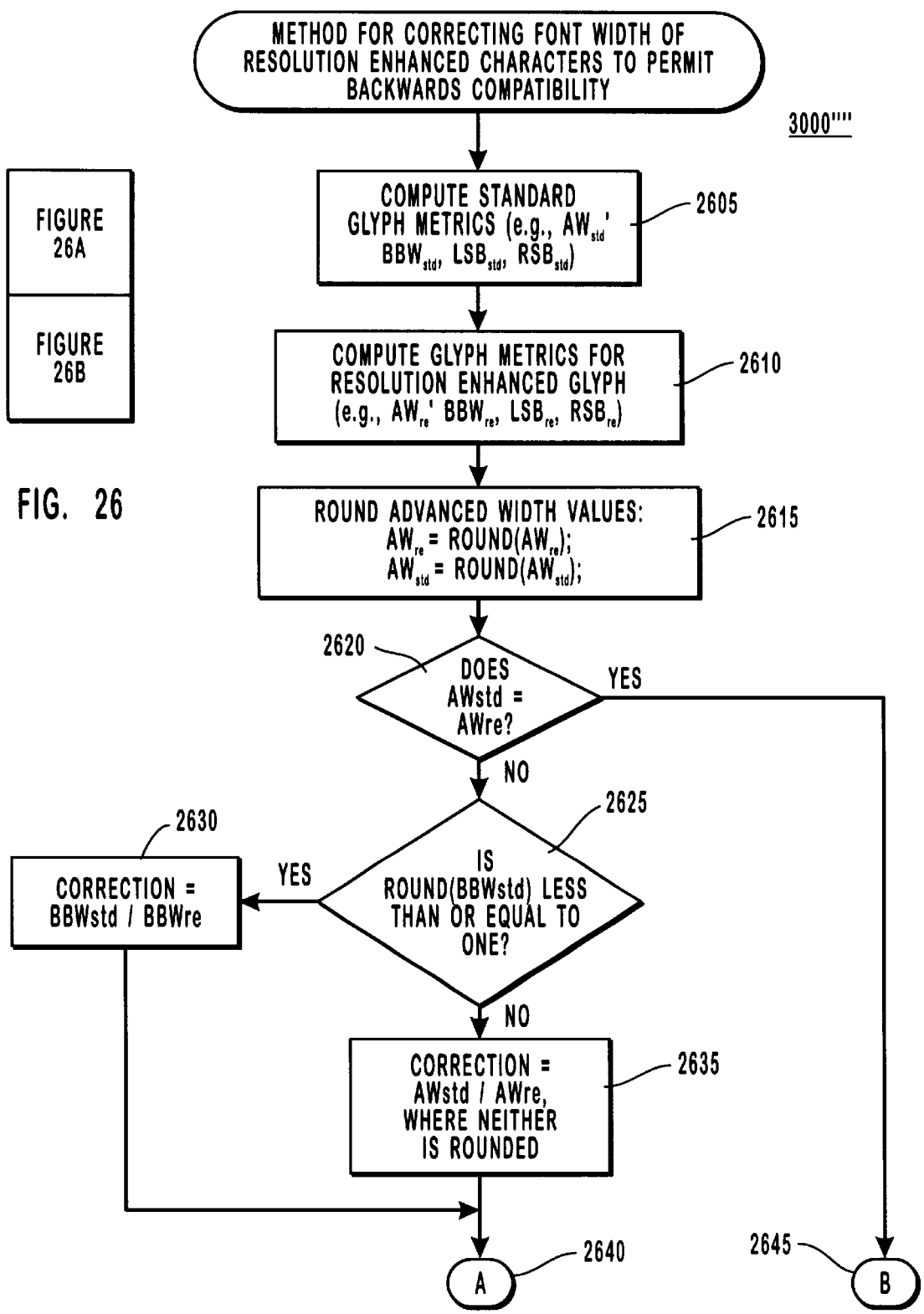
Figure 26B:
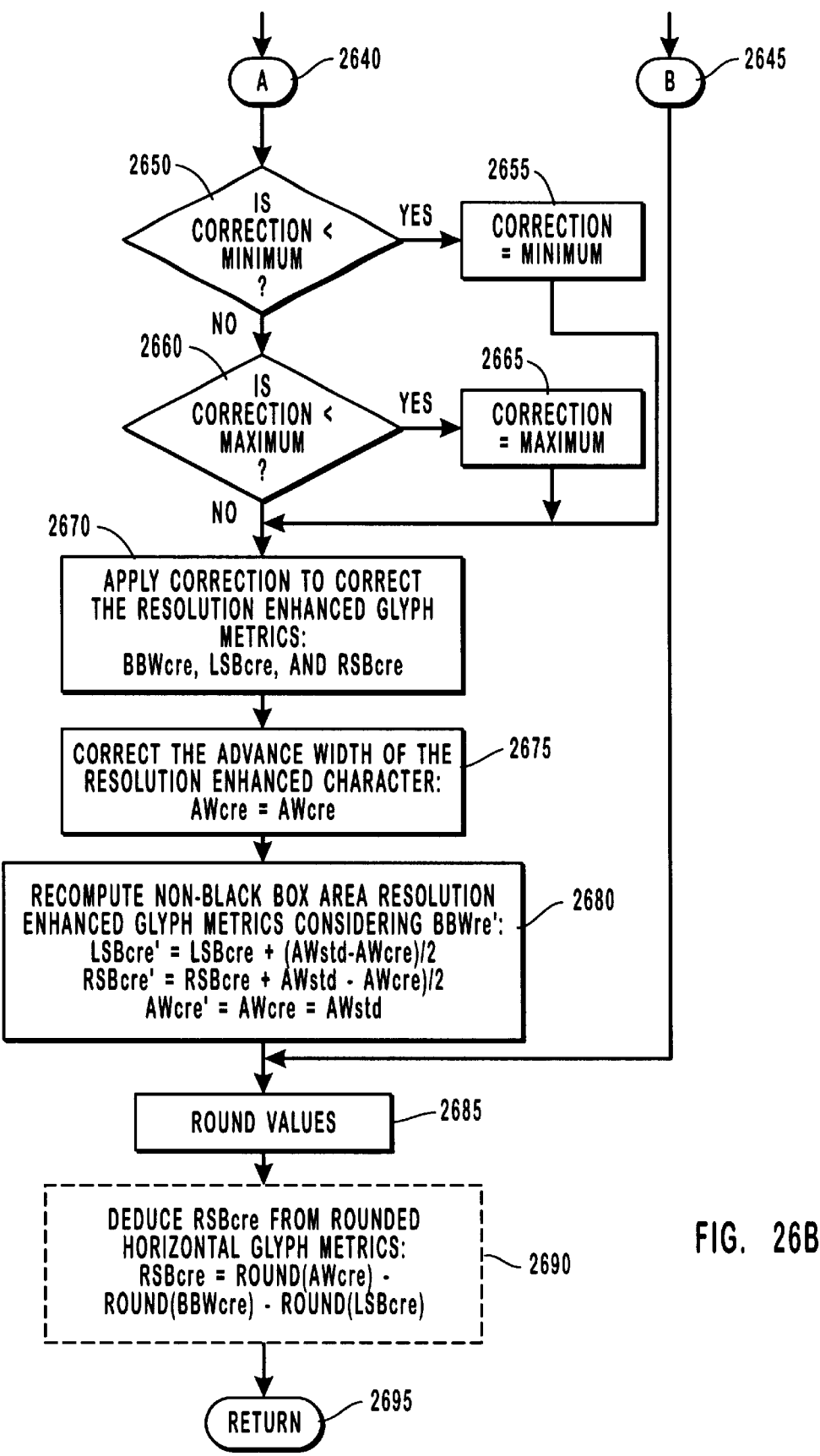

FIG. 26, which includes FIGS. 26A and 26B, is a flow diagram of an exemplary method for practicing at least one aspect of the present invention, which applies special processing for mono-stem characters.

Figure 27:
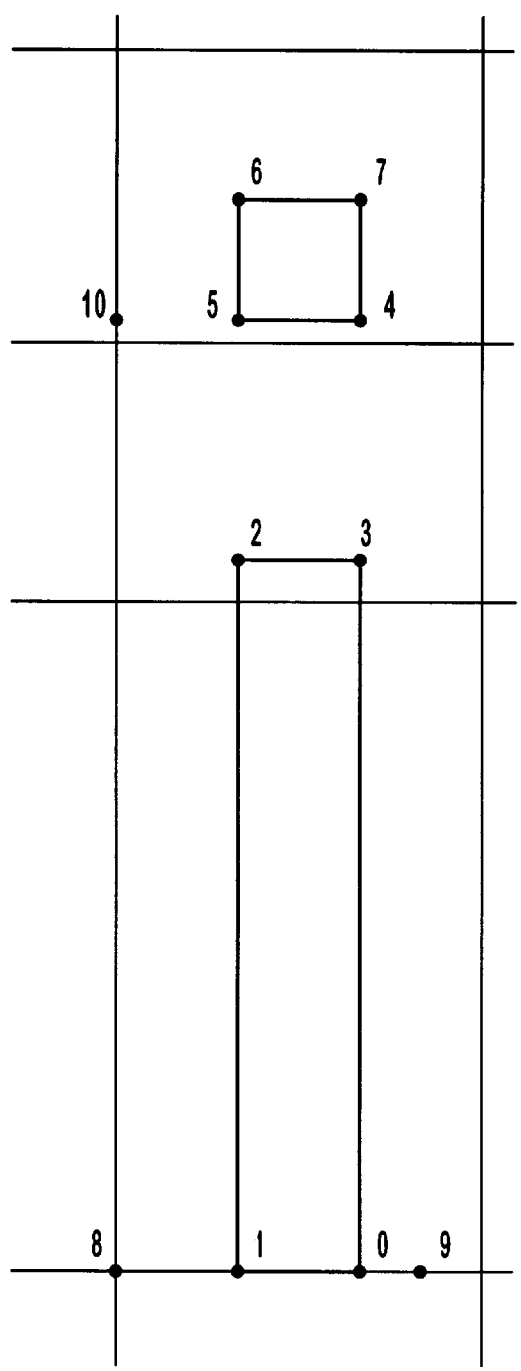

FIG. 27 illustrates the letter "i" rendered in accordance with the exemplary method of claim 19.

Figure 23:
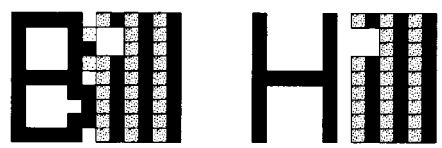
FIG. 23 is an example which illustrates a problem that occurs with mono-stem characters, when using the third exemplary method of FIG. 19.
Figure 28:

FIG. 28 illustrates the text of FIG. 23, when rendered in accordance with the exemplary method of claim 19.

Figure 29:
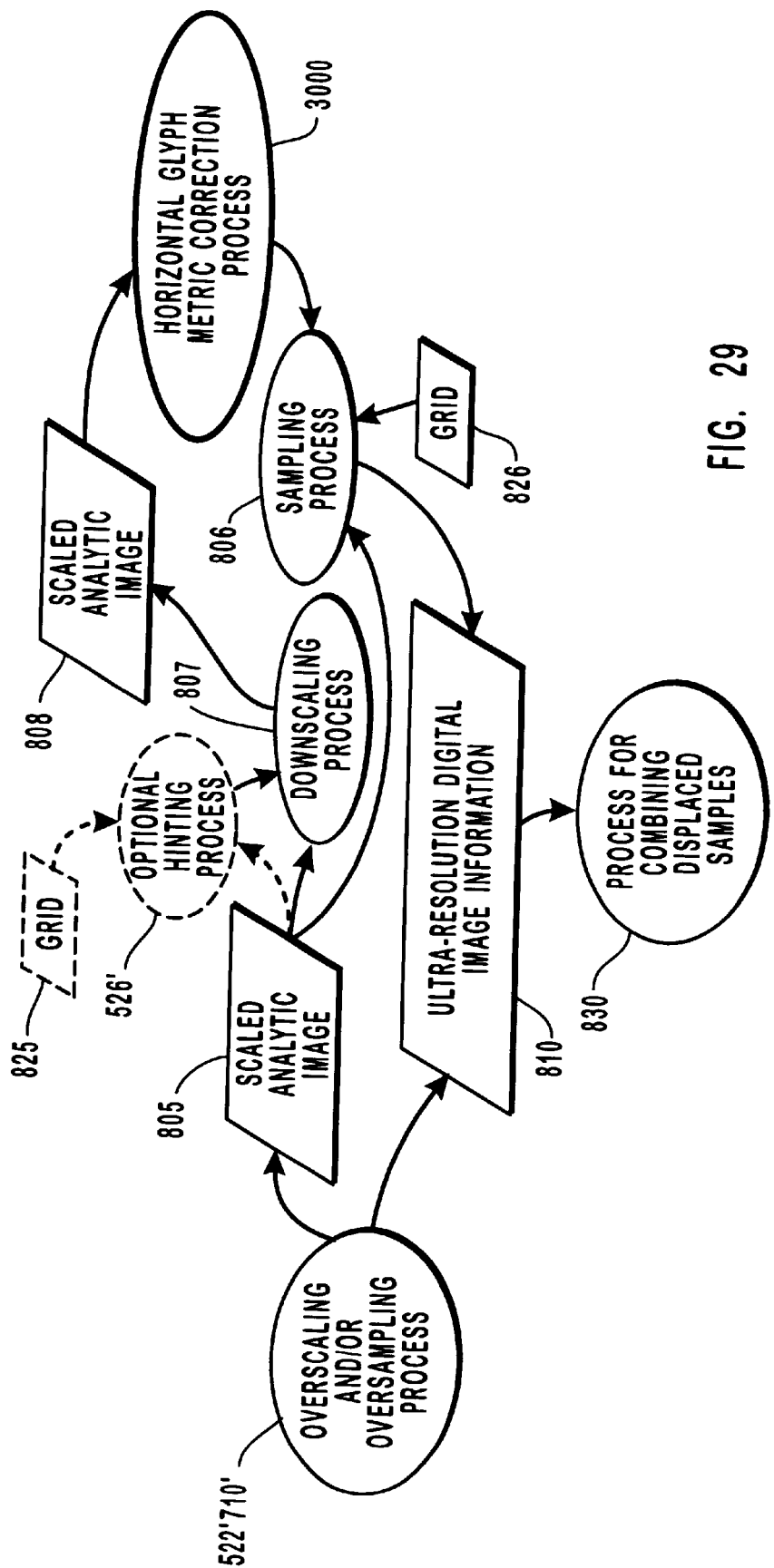

FIG. 29 illustrates how the font correction process of the present invention may be used in an environment which enhances the resolution of characters.

§ 4. DETAILED DESCRIPTION

The present invention concerns novel methods, apparatus and data structures for rendering characters on patterned displays (that is, displays having sub-pixel components). The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Functions which may be performed by the present invention are introduced in § 4.1 below. Exemplary environments in which the present invention may operate are then described in § 4.2 below. Thereafter, exemplary embodiments, methods, and data structures which may be used to effect various aspects of the present invention are described in § 4.3 below. Finally, conclusions about the present invention are presented in § 4.4 below.

§ 4.1 Functions which may be Performed

The basic function to be performed by the present invention is to adjust the widths of characters, that have had resolution enhancement processing applied, so that the widths of the characters are maintained equal to the widths of the corresponding characters that have not had resolution enhancement processing applied (e.g., standard monochrome characters). In this way, formatting of any text including such characters is maintained. This function is achieved by adjusting the advance width of each character. A further function which may be performed by the present invention is to minimize a non-uniformity of spacing between characters. This function may be achieved by adjusting the left and/or right side bearing of each character. Yet another function which may be performed by the present invention is to minimize a non-uniformity in the weight of character lines. This function may be achieved by adjusting the black body width of each character.

§ 4.2 Exemplary Environments in which the Invention may Operate

Figure 1:
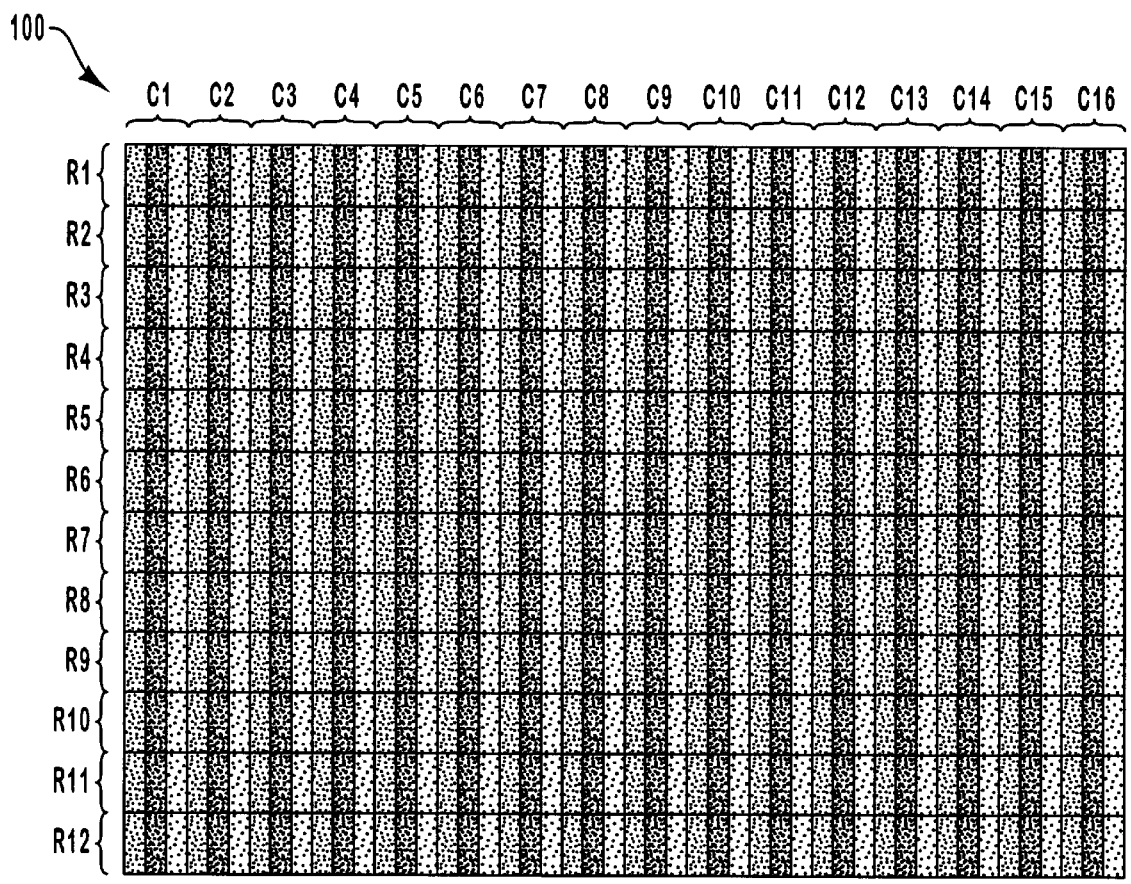
FIGS. 1 and 2 illustrate vertical striping in a conventional RGB LCD display device.
Figure 2:
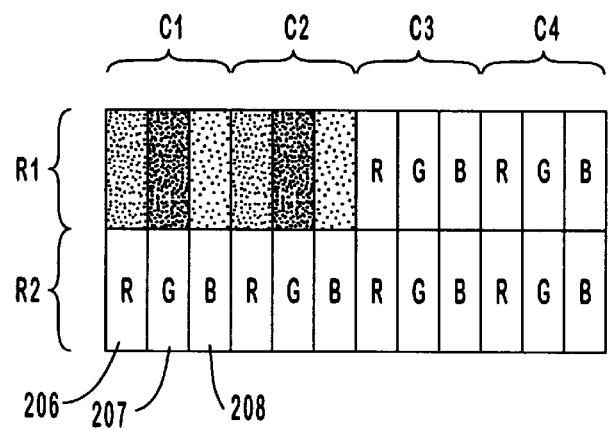
Figure 3:
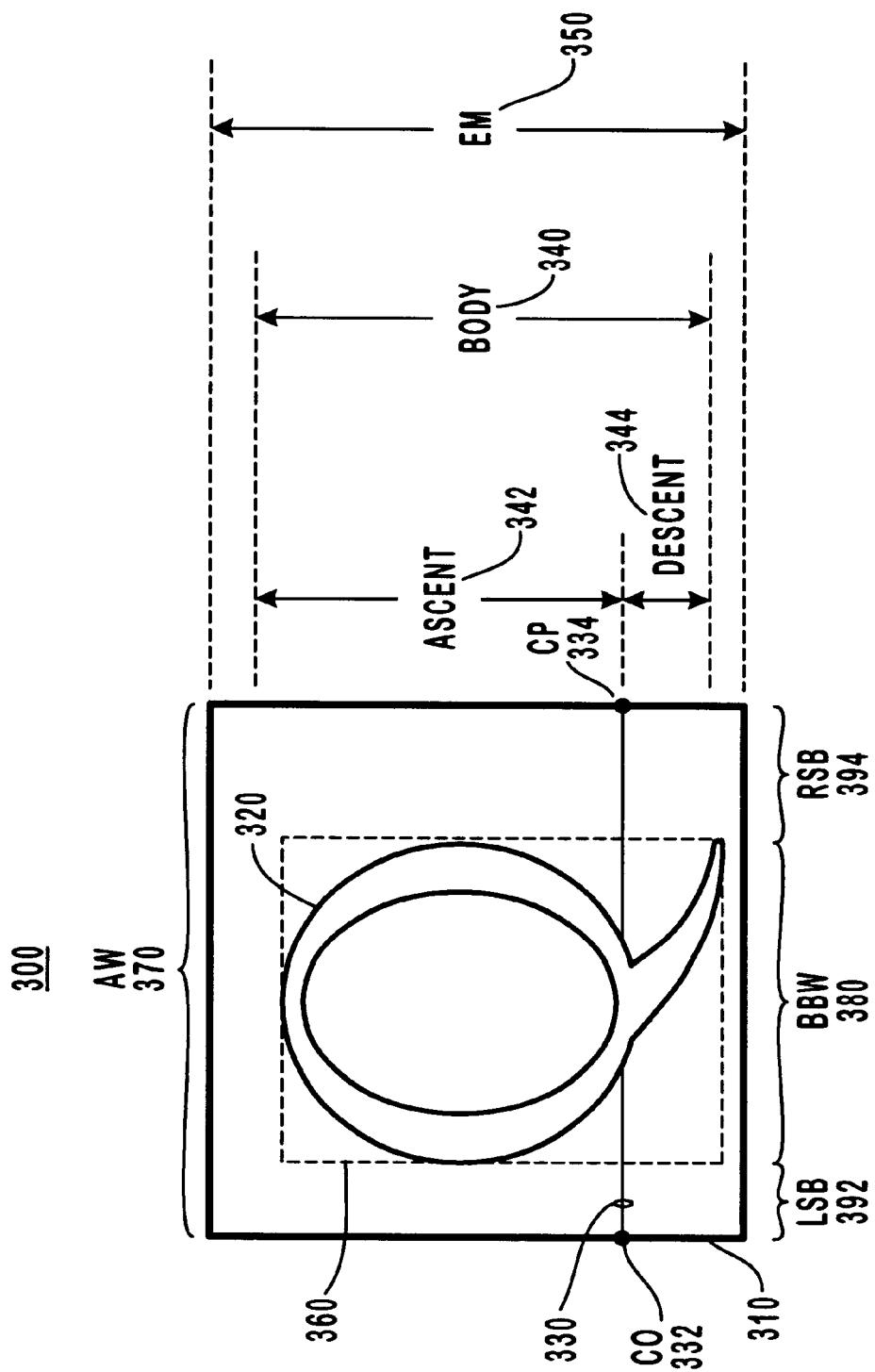
FIG. 3 illustrates certain font technology terms.
Figure 4:
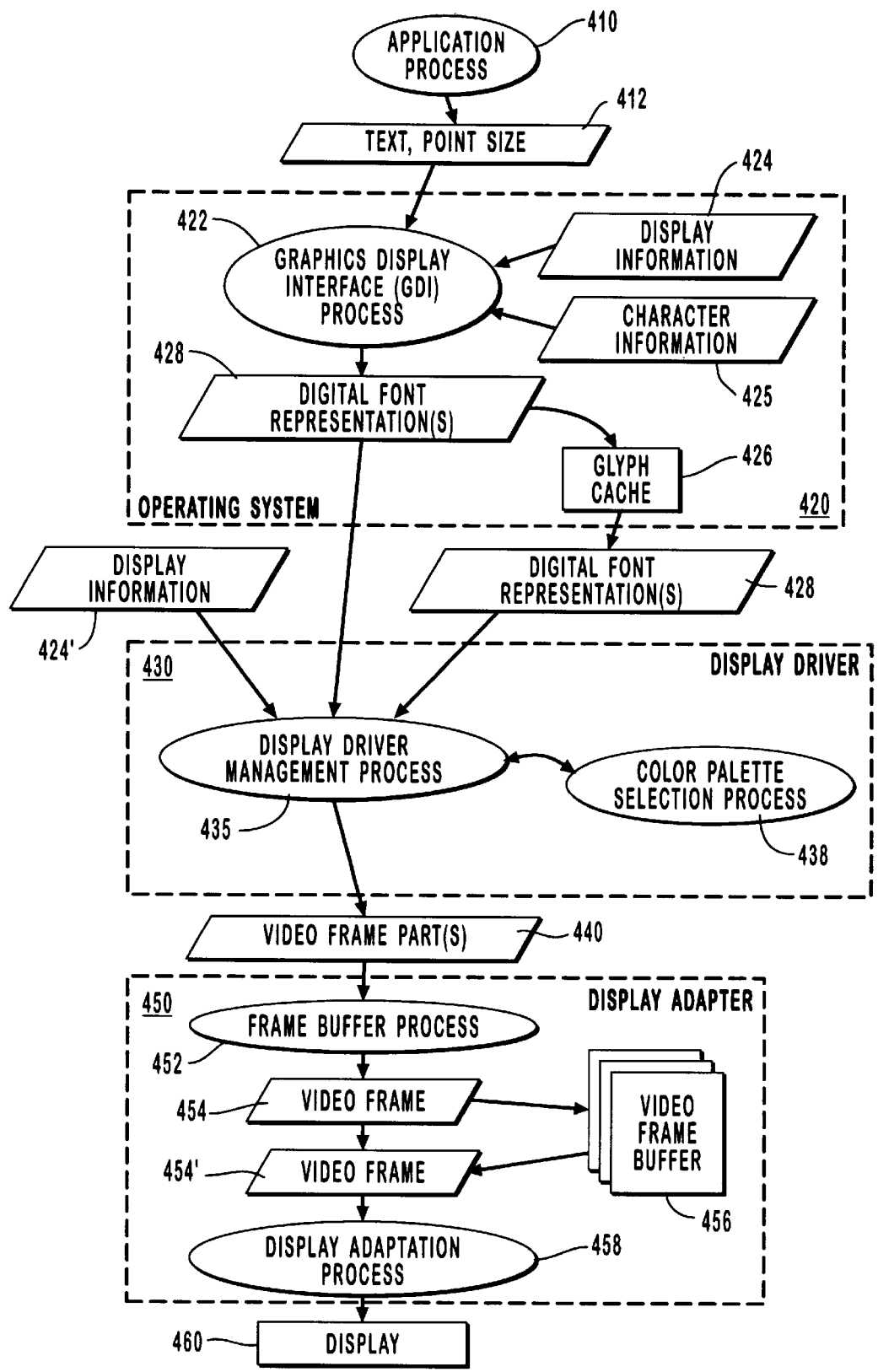
FIG. 4 illustrates processes that may be performed in a font or character rendering system in which the present invention may be implemented.
Figure 5:
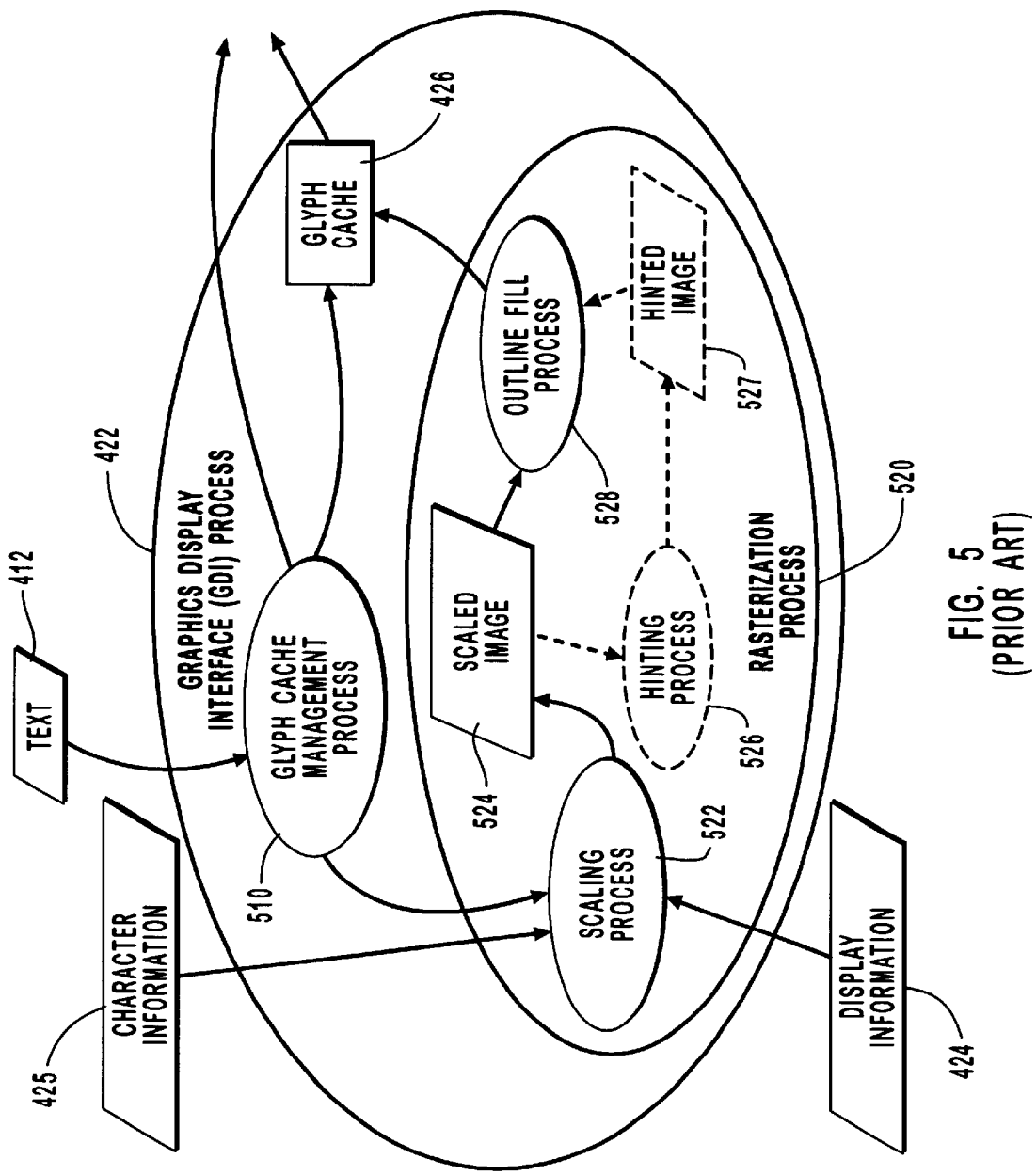
FIG. 5 illustrates processes that may be performed in a graphics display interface.
Figure 6:
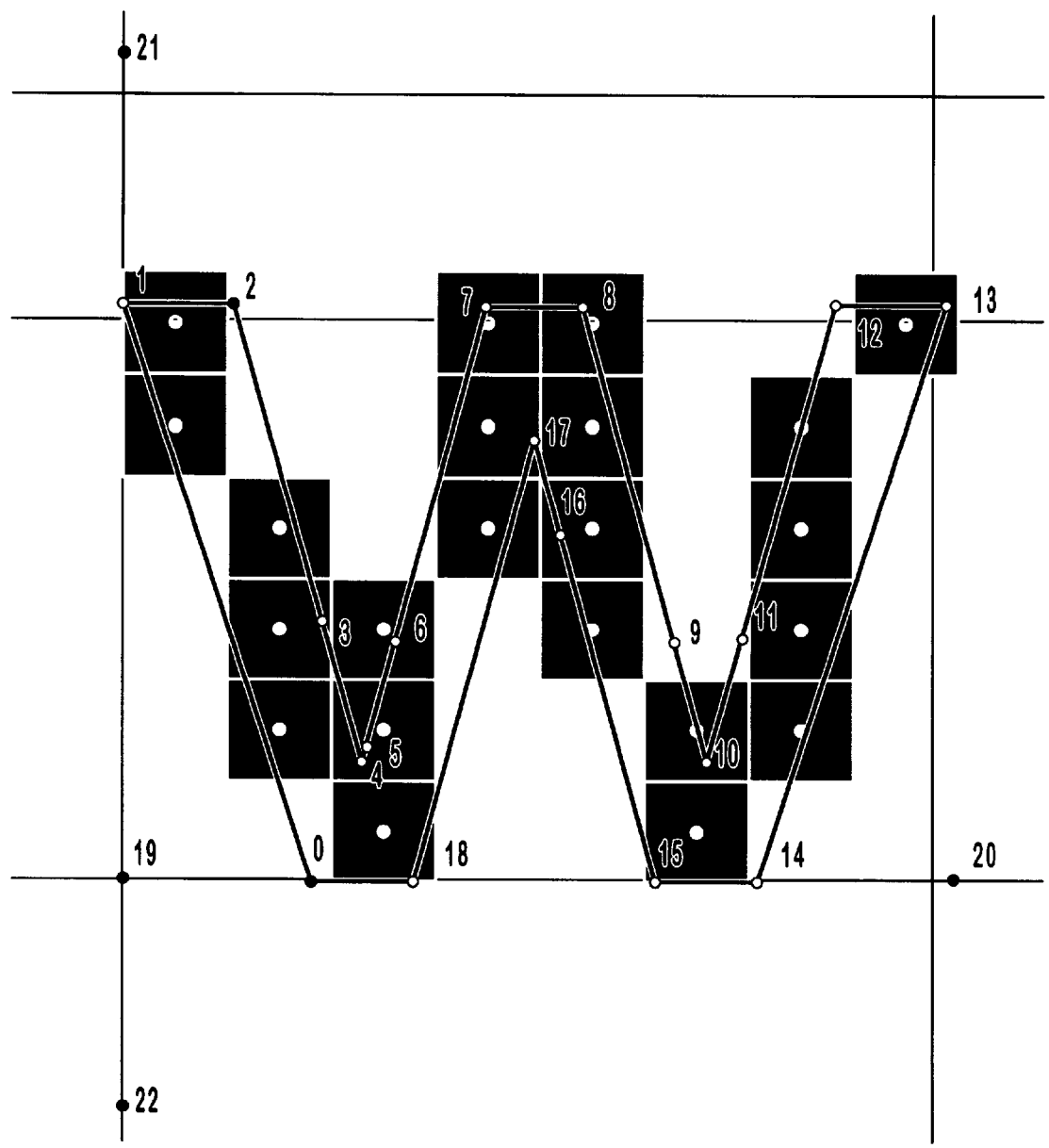
FIG. 6 illustrates pixels defining the letter "w", without hinting.
Figure 7:
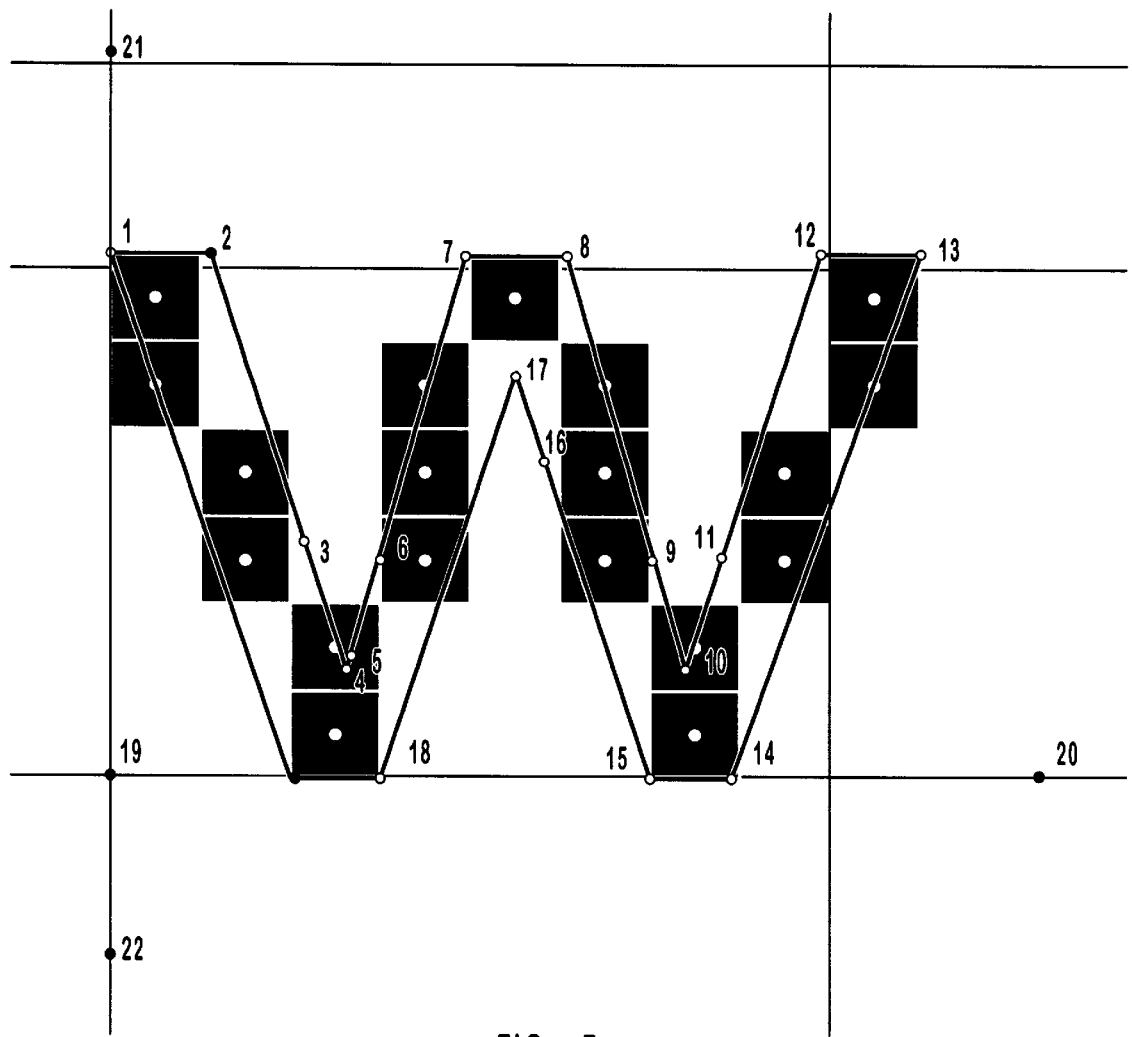
FIG. 7 illustrates pixels defining the letter "w", with hinting.
Figure 8:
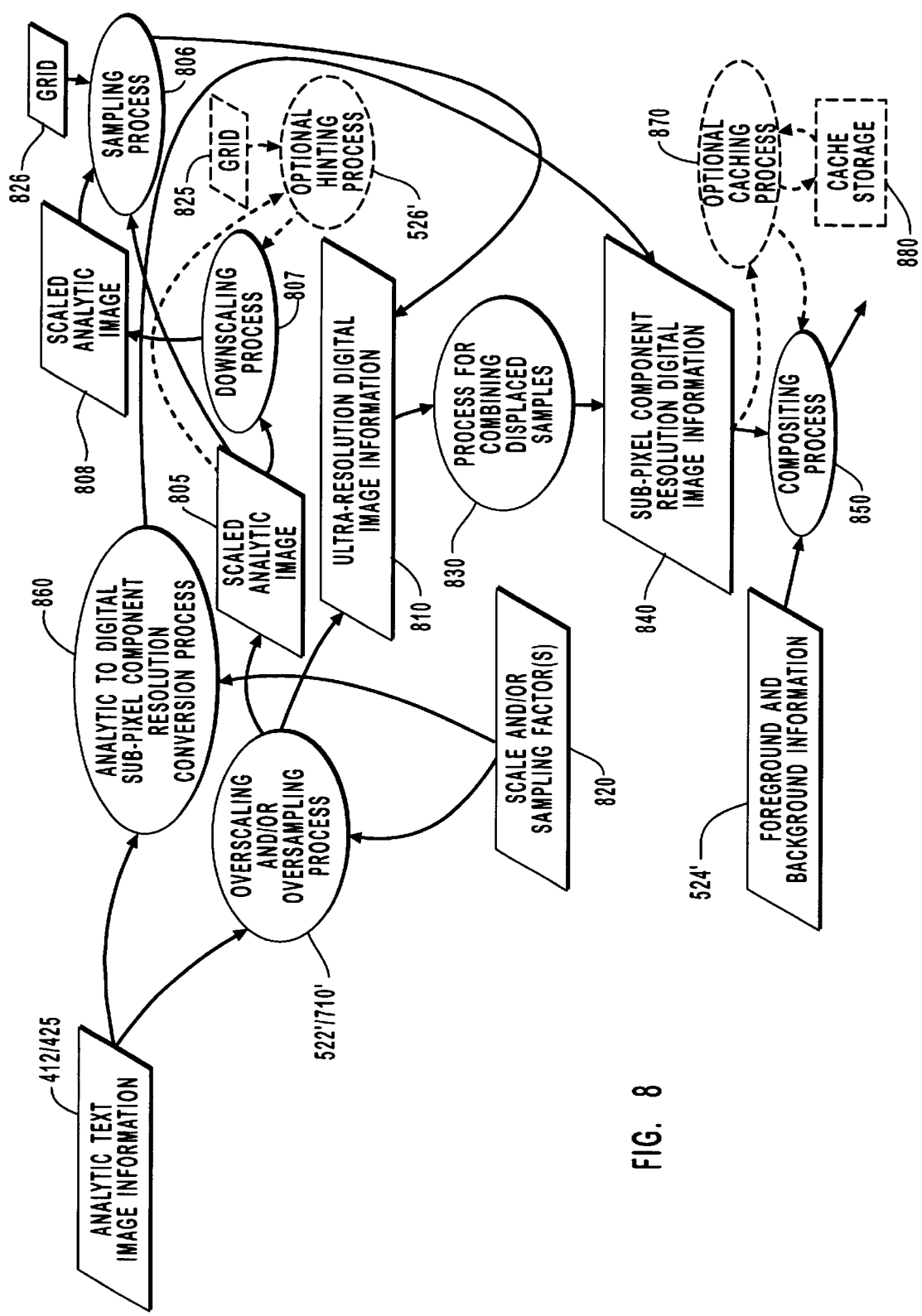
FIG. 8 illustrates processes that may be used to enhance the resolution of text.
Figure 9:
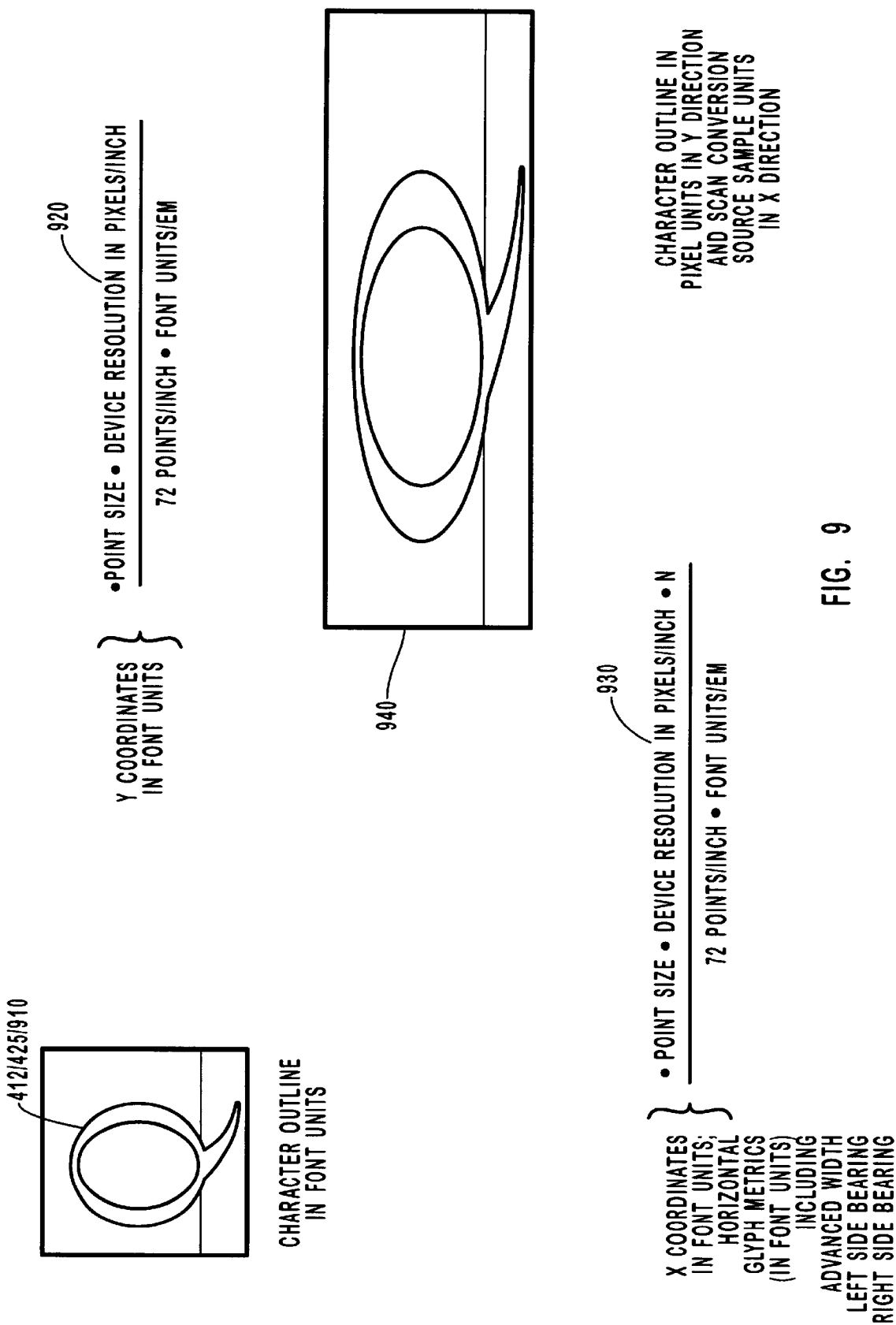
FIG. 9 illustrates an overscaling process operating on character outline information.

As alluded to above, the present invention may be used in the context of increasing the resolution of text to be rendered on a display. The techniques of the present invention may be applied to a character rendering system such as that illustrated in FIGS. 8 and 9 and described in § 1.2.2.3 above. FIG. 30 illustrates how the horizontal glyph metric correction process 3000 of the present invention may be incorporated into the character rendering system of FIG. 8. More specifically, the scaled analytic image 808 may be applied to the horizontal glyph metric correction process (or more generally, a glyph metric correction facility) 3000. Thereafter, a sampling process 806 and a process for combining displaced samples 830, for example as described in U.S. patent application Ser. No. 09/364,365, entitled "METHODS, APPARATUS AND DATA STRUCTURES FOR ENHANCING THE RESOLUTION OF IMAGES TO BE RENDERED ON PATTERNED DISPLAY DEVICES", and filed on Jul. 30, 1999, are applied. Note that in each of the scaling processes, the coordinates of the points defining the character outline may be scaled, and each of the glyph metrics may also be scaled. If the scaling is only applied in the X direction, only the X coordinates of the points defining the character outline are scaled and only the horizontal glyph metrics are scaled. Note also that the optional hinting process 526' may affect the points defining the character outline and the horizontal glyph metrics in ways that are difficult to predict.

§ 4.3 Exemplary Embodiments, Methods, and Data Structures

Exemplary apparatus in which at least some aspects of the present invention may be implemented are disclosed in § 4.3.1 below. Then, exemplary methods for effecting processes of the present invention are disclosed in § 4.3.2.

§ 4.3.1 Exemplary Apparatus

Figure 11:
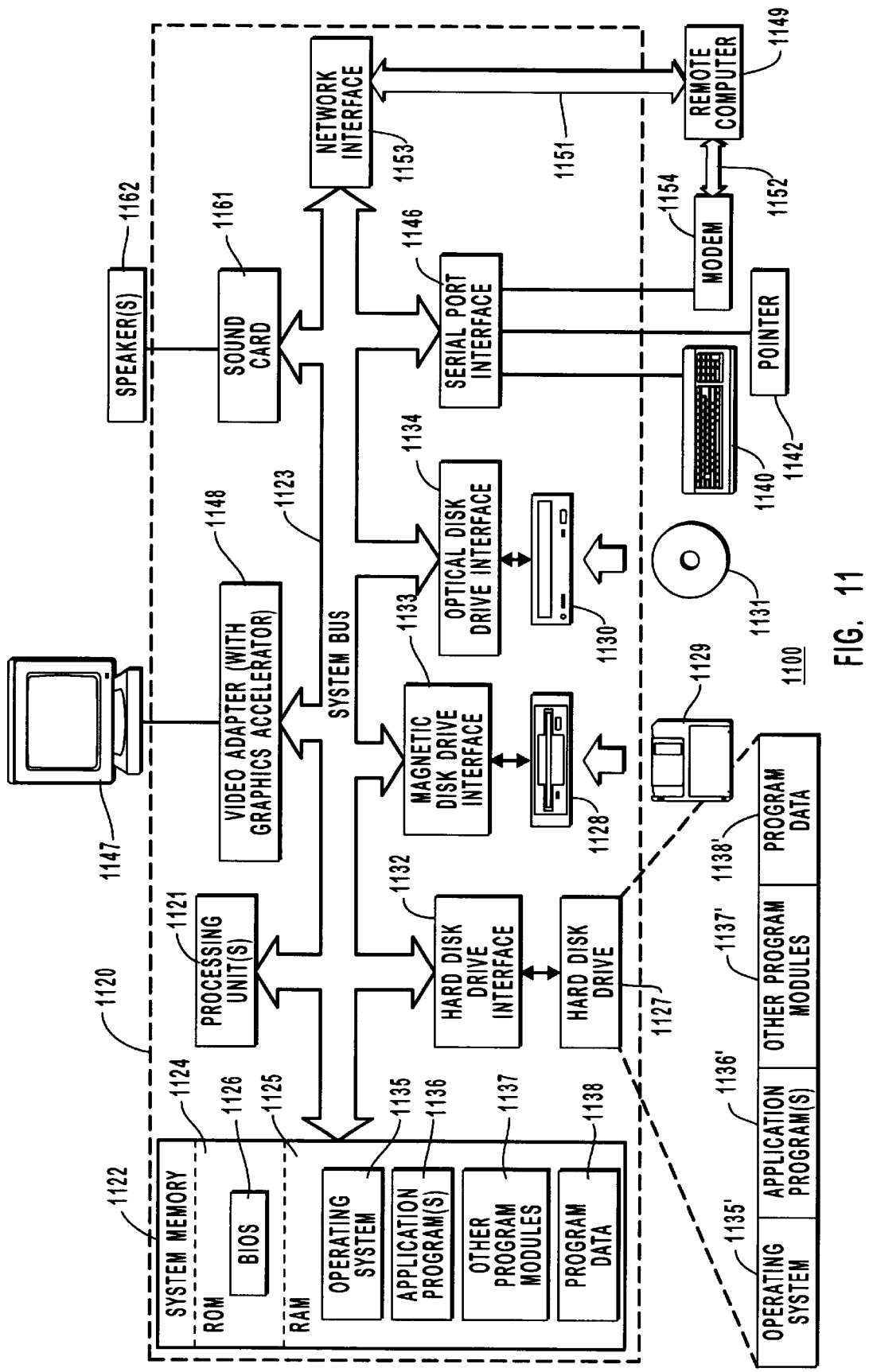
FIG. 11 is a block diagram of a computing environment in which the present invention may operate.
Figure 12:
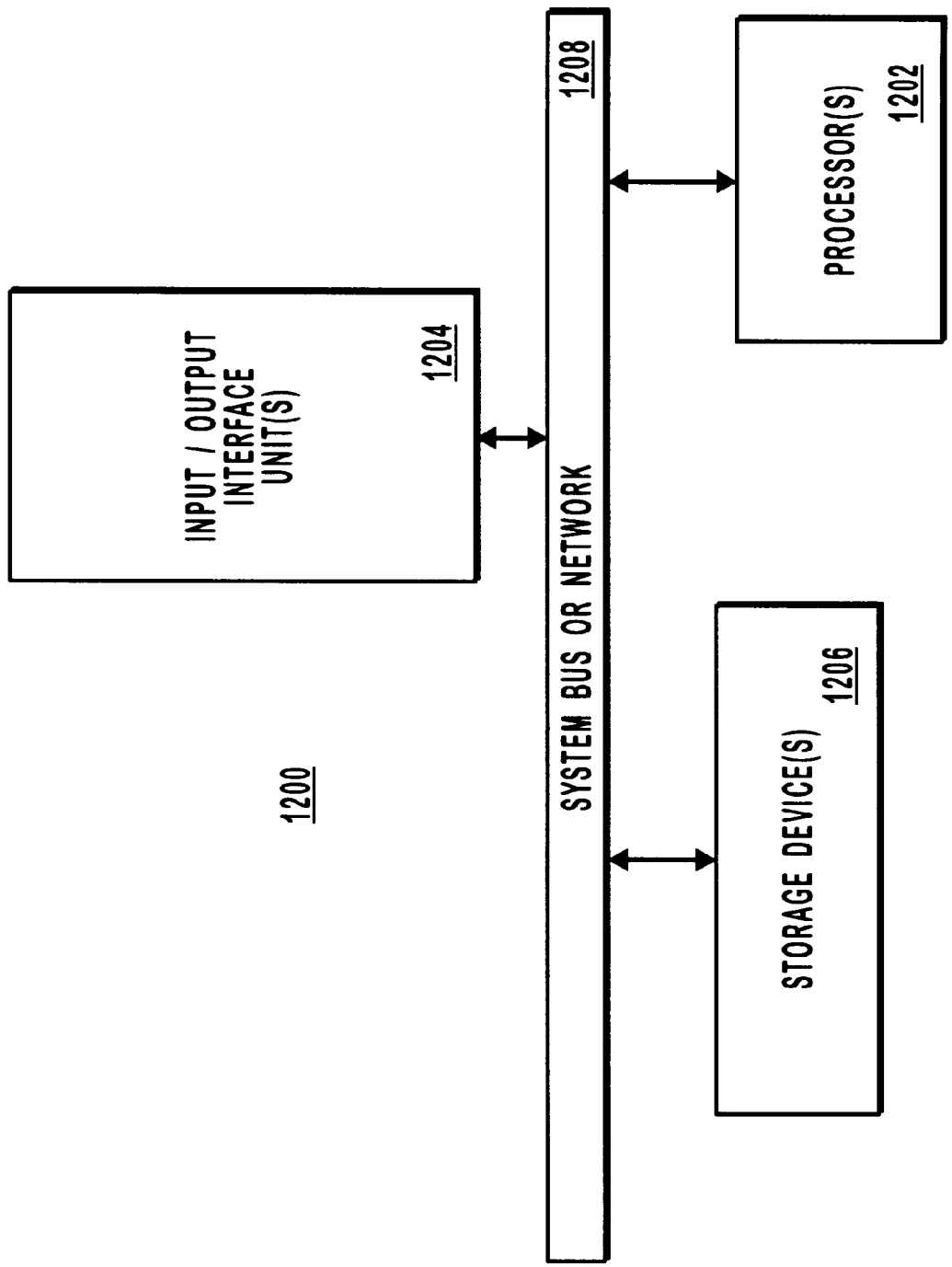
FIG. 12 is a high level block diagram of a machine environment in which the present invention may operate.

FIGS. 11 and 12 and the following discussion provide a brief, general description of an exemplary apparatus in which at least some aspects of the present invention may be implemented. Various methods of the present invention will be described in the general context of computer-executable instructions, such as program modules and/or routines for example, being executed by a computing device such as a personal computer. Other aspects of the invention will be described in terms of physical hardware such as display device components and display screens for example.

Naturally, the methods of the present invention may be effected by apparatus other than those described. Program modules may include routines, programs, objects, components, data structures (e.g., look-up tables, etc.) that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

FIG. 11 is a block diagram of an exemplary apparatus 1100 which may be used to implement at least some aspects of the present invention. A personal computer 1120 may include a processing unit 1121, a system memory 1122, and a system bus 1123 that couples various system components including the system memory 1122 to the processing unit 1121. The system bus 1123 may be any of several types of bus structures including a memory bus or memory controller, a peripheral bus, and a local bus using any of a variety of bus architectures. The system 1122 memory may include read only memory (ROM) 1124 and/or random access memory (RAM) 1125. A basic input/output system 1126 (BIOS), including basic routines that help to transfer information between elements within the personal computer 1120, such as during start-up, may be stored in ROM 1124. The personal computer 1120 may also include a hard disk drive 1127 for reading from and writing to a hard disk, (not shown), a magnetic disk drive 1128 for reading from or writing to a (e.g., removable) magnetic disk 1129, and an optical disk drive 1130 for reading from or writing to a removable (magneto) optical disk 1131 such as a compact disk or other (magneto) optical media. The hard disk drive 1127, magnetic disk drive 1128, and (magneto) optical disk drive 1130 may be coupled with the system bus 1123 by a hard disk drive interface 1132, a magnetic disk drive interface 1133, and a (magneto) optical drive interface 1134, respectively. The drives and their associated storage media provide nonvolatile storage of machine readable instructions, data structures, program modules and other data for the personal computer 1120. Although the exemplary environment described herein employs a hard disk, a removable magnetic disk 1129 and a removable optical disk 1131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 1123, magnetic disk 1129, (magneto) optical disk 1131, ROM 1124 or RAM 1125, such as an operating system 1135, one or more application programs 1136, other program modules 1137, display driver 430/1132, and/or program data 1138 for example. The RAM 1125 can also be used for storing data used in rendering images for display as will be discussed below. A user may enter commands and information into the personal computer 1120 through input devices, such as a keyboard 1140 and pointing device 1142 for example. Other input devices (not shown) such as a microphone, joystick, game pad, satellite dish, scanner, or the like may also be included. These and other input devices are often connected to the processing unit 1121 through a serial port interface 1146 coupled to the system bus. However, input devices may be connected by other interfaces, such as a parallel port, a game port or a universal serial bus (USB). A monitor 460/1147 or other type of display device may also be connected to the system bus 1123 via an interface, such as a display adapter 450/1148, for example. In addition to the monitor 460/1147, the personal computer 1120 may include other peripheral output devices (not shown), such as speakers and printers for example.

The personal computer 1120 may operate in a networked environment which defines logical connections to one or more remote computers, such as a remote computer 1149. The remote computer 1149 may be another personal computer, a server, a router, a network PC, a peer device or other common network node, and may include many or all of the elements described above relative to the personal computer 1120. The logical connections depicted in FIG. 11 include a local area network (LAN) 1151 and a wide area network (WAN) 1152 (such as an intranet and the Internet for example).

When used in a LAN, the personal computer 1120 may be connected to the LAN 1151 through a network interface adapter card (or "NIC") 1153. When used in a WAN, such as the Internet, the personal computer 1120 may include a modem 1154 or other means for establishing communications over the wide area network 1152. The modem 1154, which may be internal or external, may be connected to the system bus 1123 via the serial port interface 1146. In a networked environment, at least some of the program modules depicted relative to the personal computer 1120 may be stored in the remote memory storage device. The network connections shown are exemplary and other means of establishing a communications link between the computers may be used.

FIG. 12 is a more general machine 1200 which may effect at least some aspects of the present invention.

The machine 1200 basically includes a processor(s) 1202, an input/output interface unit(s) 1204, a storage device(s) 1206, and a system bus or network 1208 for facilitating data and control communications among the coupled elements. The processor(s) 1202 may execute machine-executable instructions to effect one or more aspects of the present invention. At least a portion of the machine executable instructions and data structures may be stored (temporarily or more permanently) on the storage devices 1206 and/or may be received from an external source via an input interface unit 1204.

Having described exemplary apparatus which may be used to effect at least some aspects of the present invention, exemplary methods for effecting at least some of the processes discussed in § 4.1 above are described.

§ 4.3.2 Exemplary Methods

Four (4) exemplary methods for performing various aspects of the present invention are presented in §§ 4.3.2.1 through 4.3.2.4 below. When the methods, the following terminology and notation may be used:

| | |
|---|---|
| std | identifies a horizontal glyph metric that results from standard (that is, non-resolution enhanced) processing; |
| re | identifies a horizontal glyph metric that results from resolution enhancement processing; |
| lre | identifies a horizontal glyph metric, that results from resolution enhancement processing, which has been limited (or clipped); |
| cre | identifies a horizontal glyph metric, that results from resolution enhancement processing, which has been corrected; |
| round(x) | denotes a rounding operation performed on x; |
| AW | denotes advance width; |
| LSB | denotes left side bearing; |
| RSB | denotes right side bearing; and |
| BBW | denotes black body width. |

It should be understood that the order of the processing of the acts defining the methods illustrated are illustrative only and, in many instances, equivalent results may be arrived at by reordering some acts of the methods.

§ 4.3.2.1 First Exemplary Method

Figure 10:
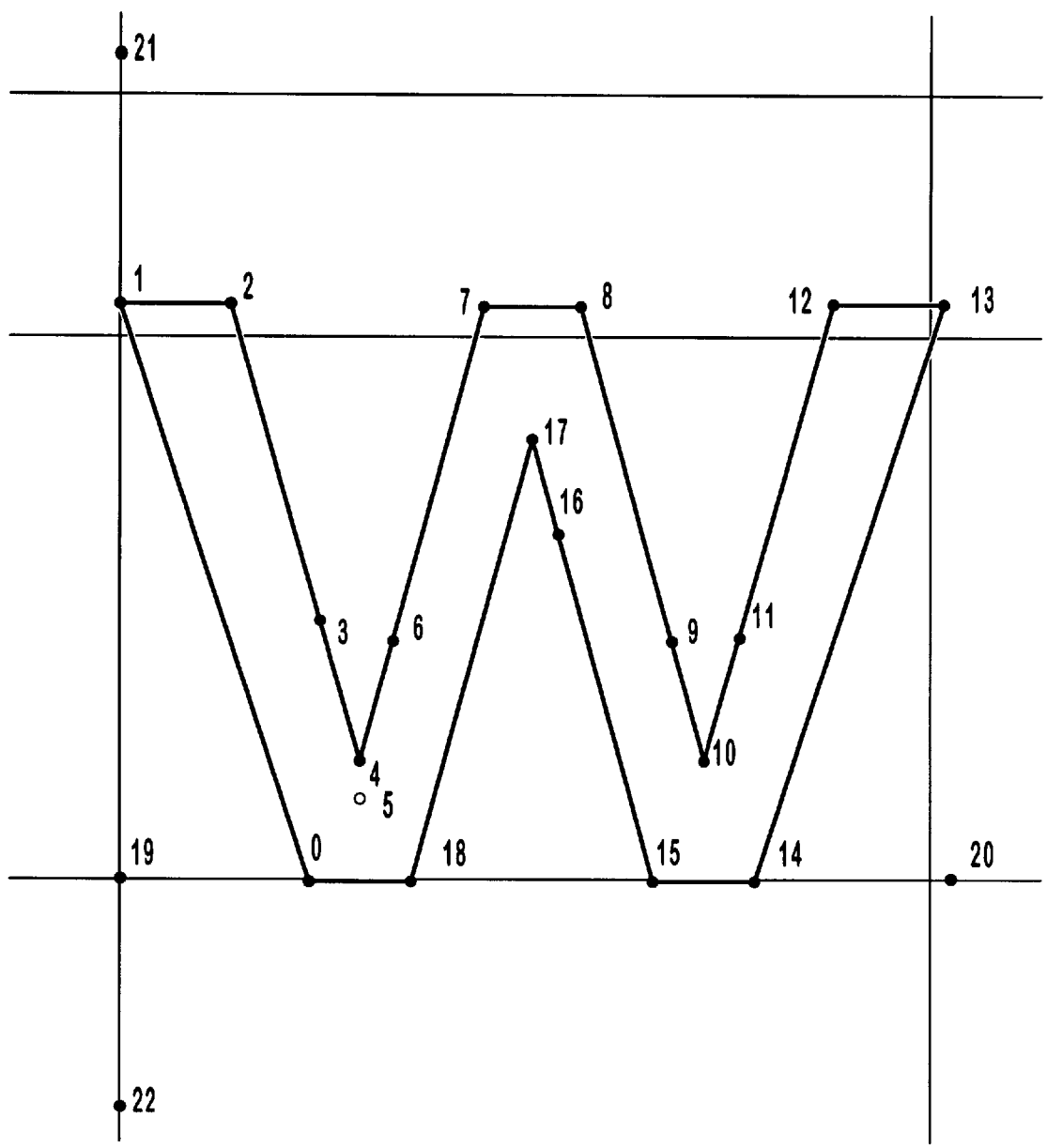
FIG. 10 illustrates sub-pixel components defining the letter "w", with hinting.
Figure 13:
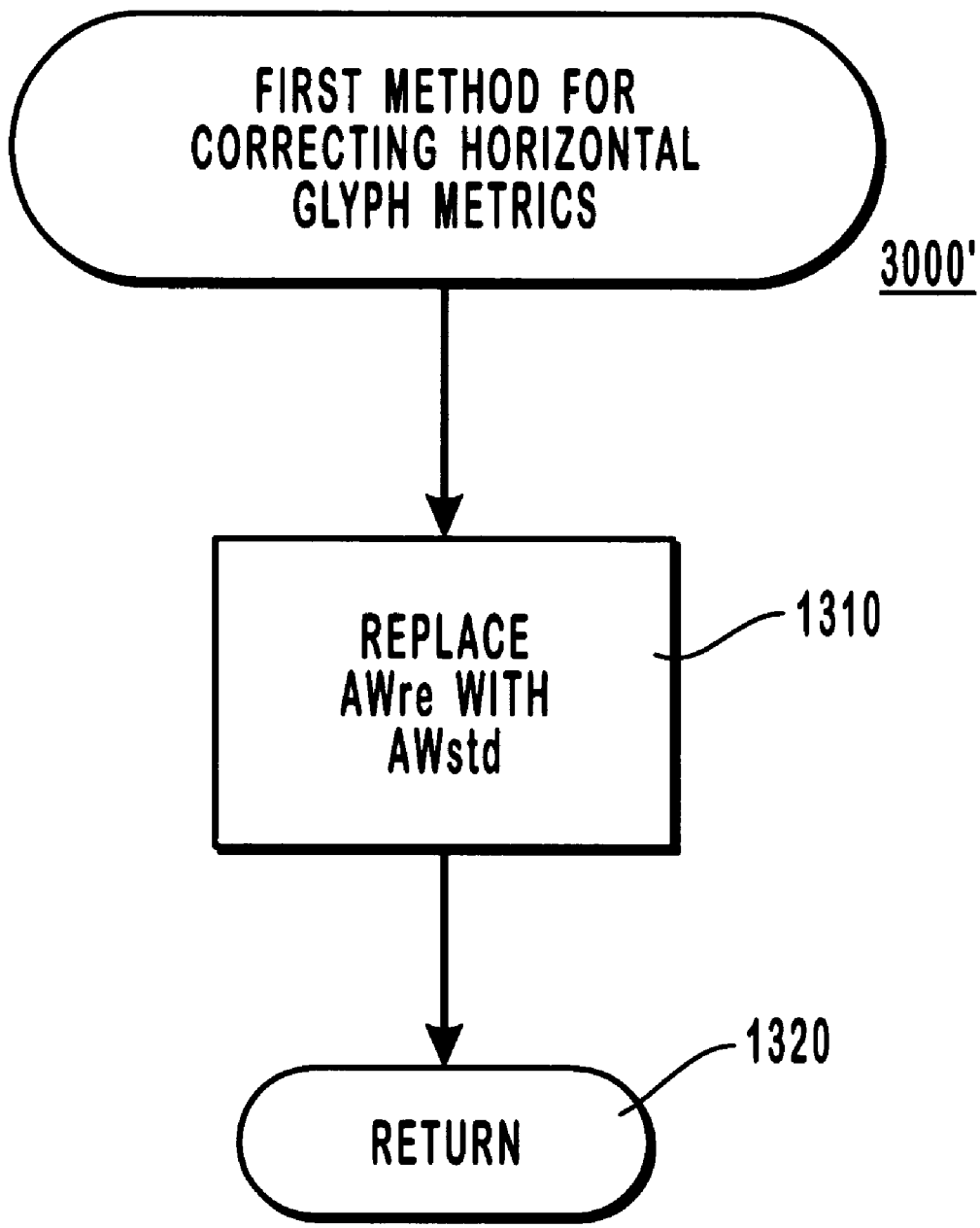
FIG. 13 is a flow diagram of a first exemplary method which may be used to practice at least one aspect of the present invention.
Figures 14, 15:
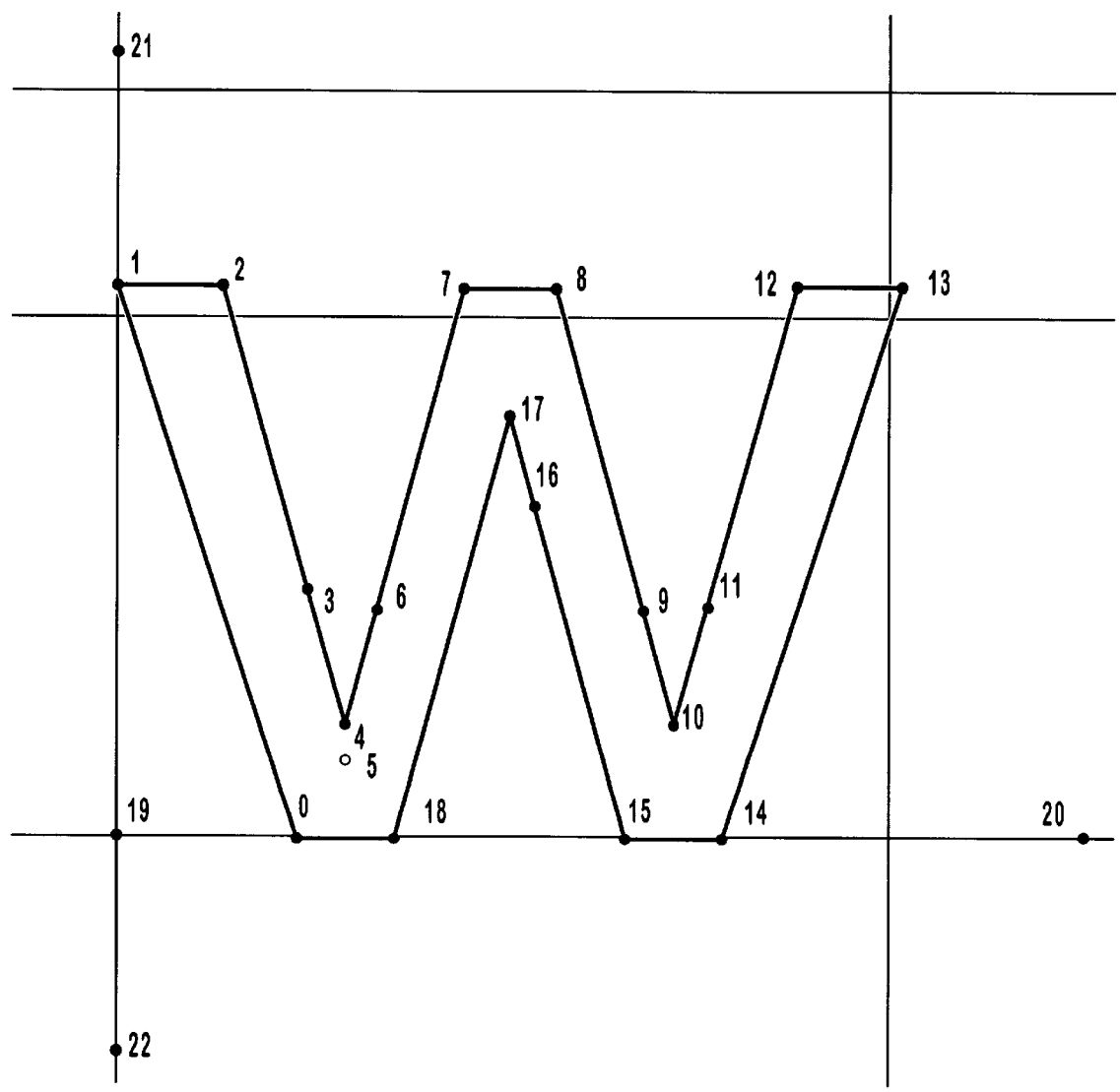
FIG. 14 illustrates a "w" character outline rendered using the first exemplary method of FIG. 13.
FIG. 15 illustrates a gap problem that may arise when using the first exemplary method of FIG. 13.

FIG. 13 is a flow diagram of a first exemplary method 3000' which may be used to effect at least some aspects of the horizontal glyph metric correction process 3000. The first exemplary method 3000' includes the simple act of, for each character, replacing the advance width of the resolution enhanced character ($AW_{re}$) with the advance width of the standard character ($AW_{std}$), as shown in act 1310. The method is then left via RETURN node 1320. Thus, the corrected advance width of the resolution enhanced character is the same as the advance width of the standard character (that is, $AW_{cre}=AW_{std}$). The right side bearing may be defined or corrected to equal the corrected advance width less the resolution enhanced black body width and the resolution enhanced left side bearing (that is, $RSB_{cre}=AW_{cre}-BBW_{re}-LSB_{re}$). FIG. 14 illustrates a "w" character outline rendered using the first exemplary method of FIG. 14. Comparing FIGS. 14 and 10, notice that the point 20 has moved horizontally to the right. Unfortunately, as shown in FIG. 15, uneven spacing and large gaps, such as that appearing between the "W" and the "s" in the word "news", may occur when this first exemplary method 3000' is applied. Although, in the example illustrated in FIGS. 14 and 15, the advance width increased, thereby increasing the right side bearing, it is possible that the advance width will decrease, thereby decreasing the right side bearing. In such a case, the spacing between letters may become too small. Indeed, adjacent letters may overlap if the sum of the resolution enhanced black body width and left side bearing is greater than the corrected resolution enhanced advance width (that is, if $LSB_{re}+BBW_{re}>AW_{cre}$).

§ 4.3.2.2 Second Exemplary Method

Figure 16:
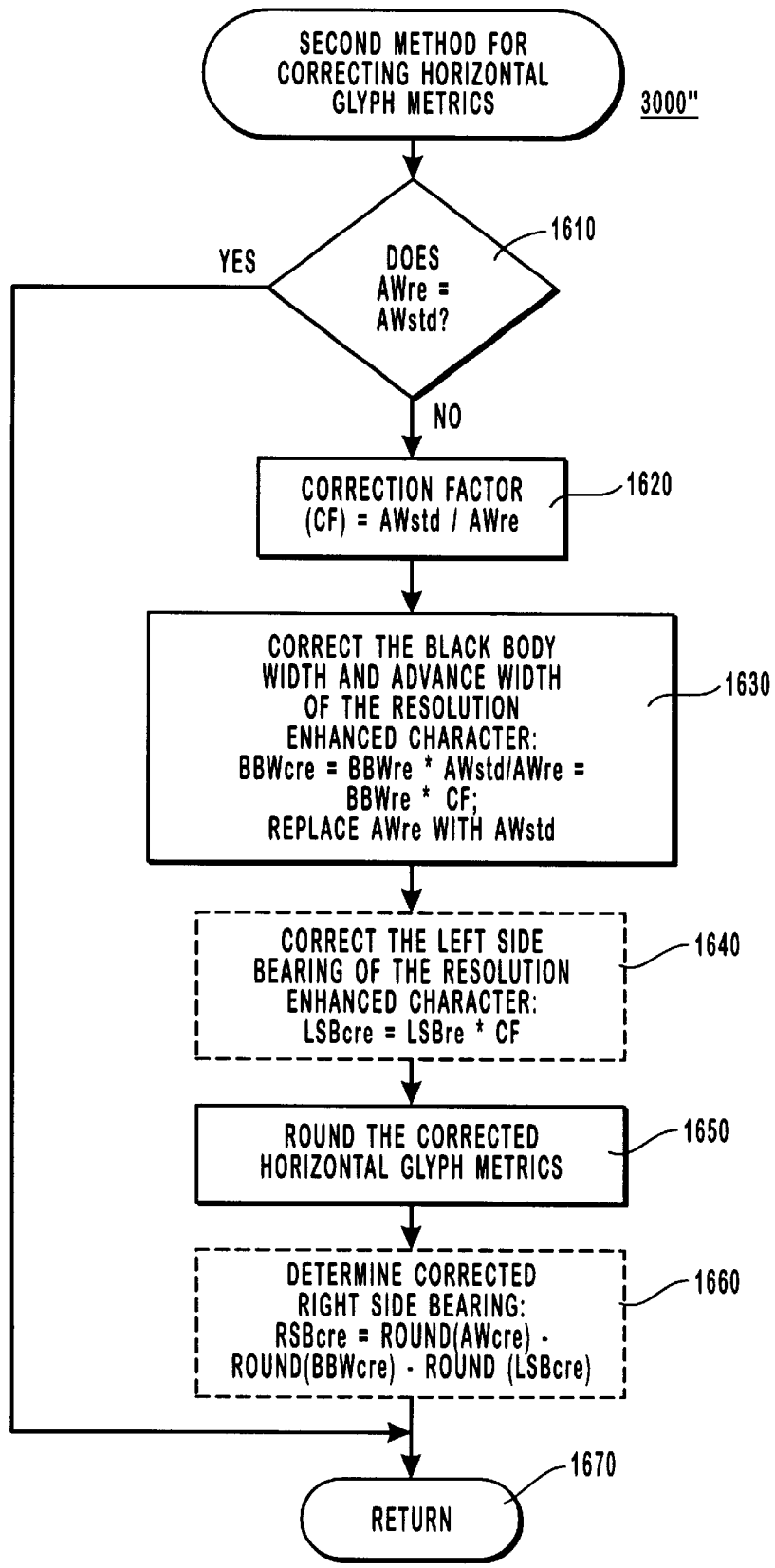
FIG. 16 is a flow diagram of a second exemplary method which may be used to practice at least one aspect of the present invention.

FIG. 16 is a flow diagram of a second exemplary method 3000" which may be used to effect the horizontal glyph metric correction process 3000. The second exemplary method 3000" basically solves the potential problem of uneven spacing between letters by linearly stretching or compressing the black body width of the resolution enhanced character. This method 3000" may further shift the stretched or compressed character to the left or right, respectively. Referring to FIG. 16, at decision branch point 1610, it is determined whether or not the advance width of the resolution enhanced character ($AW_{re}$) is the same as the advance width of the standard character ($AW_{std}$). If so, the method 3000" is simply left via RETURN node 1670. If, on the other hand, the advance width of the resolution enhanced character ($AW_{re}$) is not the same as the advance width of the standard character ($AW_{std}$), the method continues to act 1620 where a correction factor (CF) is set to the advance width of the standard character divided by the advance width of the resolution enhanced character (that is $AW_{std}/AW_{re}$). Then, as shown in act 1630 the black body width of the resolution enhanced character ($BBW_{re}$) is stretched or compressed. This stretching or compressing may be done linearly based on the correction factor (that is, $BBW_{cre}=BBW_{re}*AW_{std}/AW_{re}=BBW_{re}*CF$). Alternatively, the stretching or compressing may be done linearly based on a ratio of the black body width of the standard character to the black body width of the resolution enhanced character (that is, $BBW_{cre}=BBW_{re}*BBW_{std}/BBW_{re}$). In this latter case, it can be appreciated that the corrected black body width of the resolution enhanced character may simply be set to the black body width of the standard character (that is, $BBW_{cre}=BBW_{std}$). The advance width of the resolution enhanced character is also corrected based on the correction factor as shown in step 1630 (that is, $AW_{cre}=AW_{re}*CF=AW_{re}*AW_{std}/AW_{re}\equiv AW_{std}$). Notice that this is equivalent to merely setting the advance width of the resolution enhanced character to the advance width of the standard character (that is, $AW_{cre}=AW_{std}$).

As stated above, this method 3000″ may further shift the stretched or compressed character to the left or right, respectively. For example, as shown in optional act 1640, the left side bearing of the resolution enhanced character may be corrected based on the correction factor (that is, $LSB_{cre}=LSB_{re}*CF$). The right side bearing may be similarly corrected (that is, $RSB_{cre}=RSB_{re}*CF$). However, since the corrected advance width, black body width and left side bearing may all be rounded, as shown in act 1650, the corrected right side bearing may be deduced from the other horizontal glyph metrics as follows:

$$RSB_{cre}=\text{round }(AW_{cre})-\text{round }(BBW_{cre})-\text{round }(LSB_{cre}),$$

as shown in act 1660. The method 3000″ is then left via RETURN node 1670.

When implementing the stretching or compressing of the character outline, the points defining (i.e., the X coordinates of) the character outline are actually scaled based on the appropriate ratio.

Figures 17, 18:
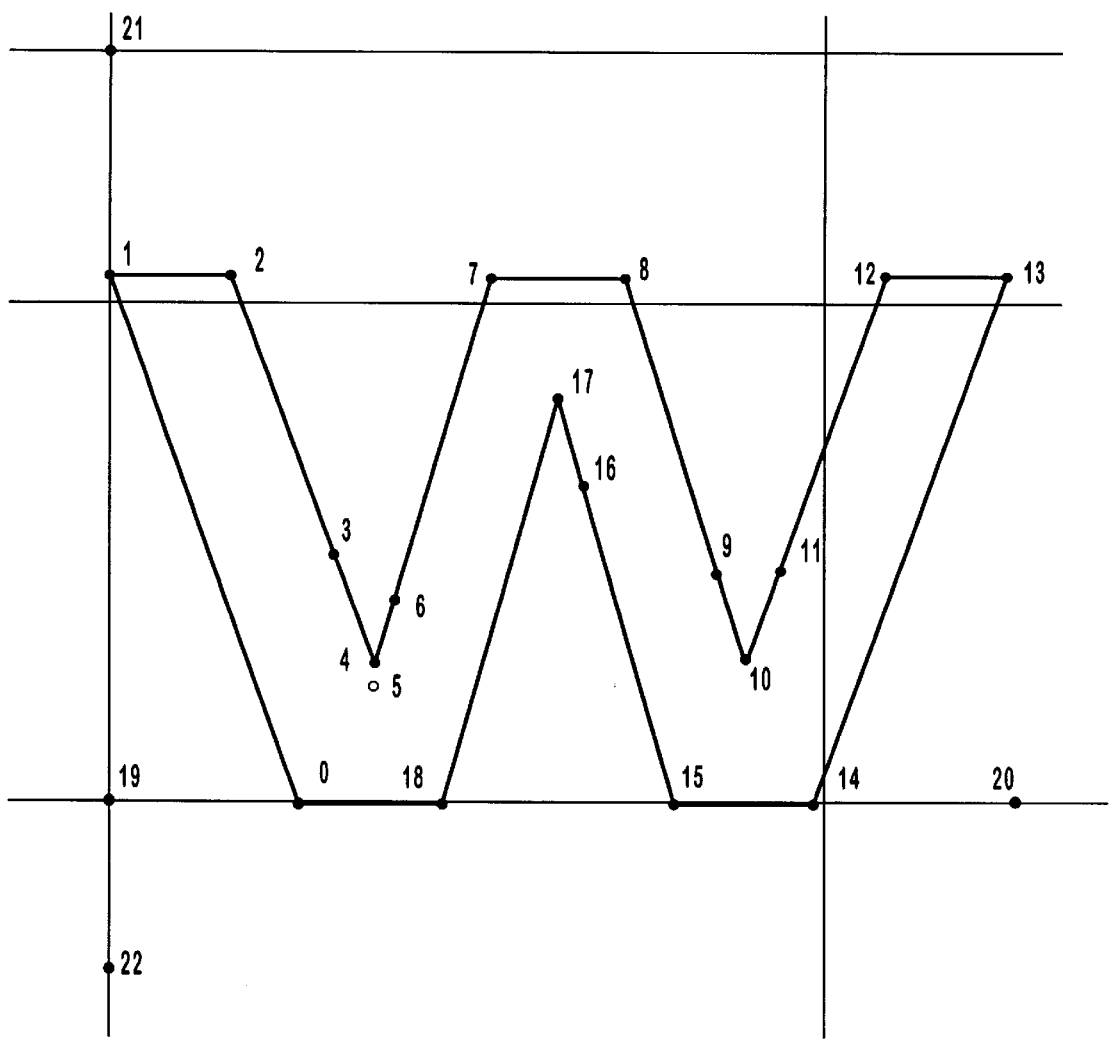
FIG. 17 illustrates a "w" character outline, rendered using the second exemplary method of FIG. 16.
FIG. 18 illustrates a line thickness problem that may arise when using the second exemplary method of FIG. 16.

FIG. 17 illustrates a "w" character outline, rendered using the second exemplary method 3000″ of FIG. 16. Notice that the coordinates of the points defining the "w" have been scaled such that the "w" has been stretched. Unfortunately, however, FIG. 18 illustrates a line weight problem that may arise when using the second exemplary method 3000″ of FIG. 16. That is, if the character outline is stretched too much, the line weight of the resulting character may be readily perceived as too heavy with respect to the other characters. On the other hand, if the character outline is compressed too much, the line weight of the resulting character may be readily perceived as too light with respect to the other characters. In either case, a person viewing the rendering of such characters may become annoyed at the variation in character weight or may perceive that something is not quite right.

§ 4.3.2.3 Third Exemplary Method

Figure 19:
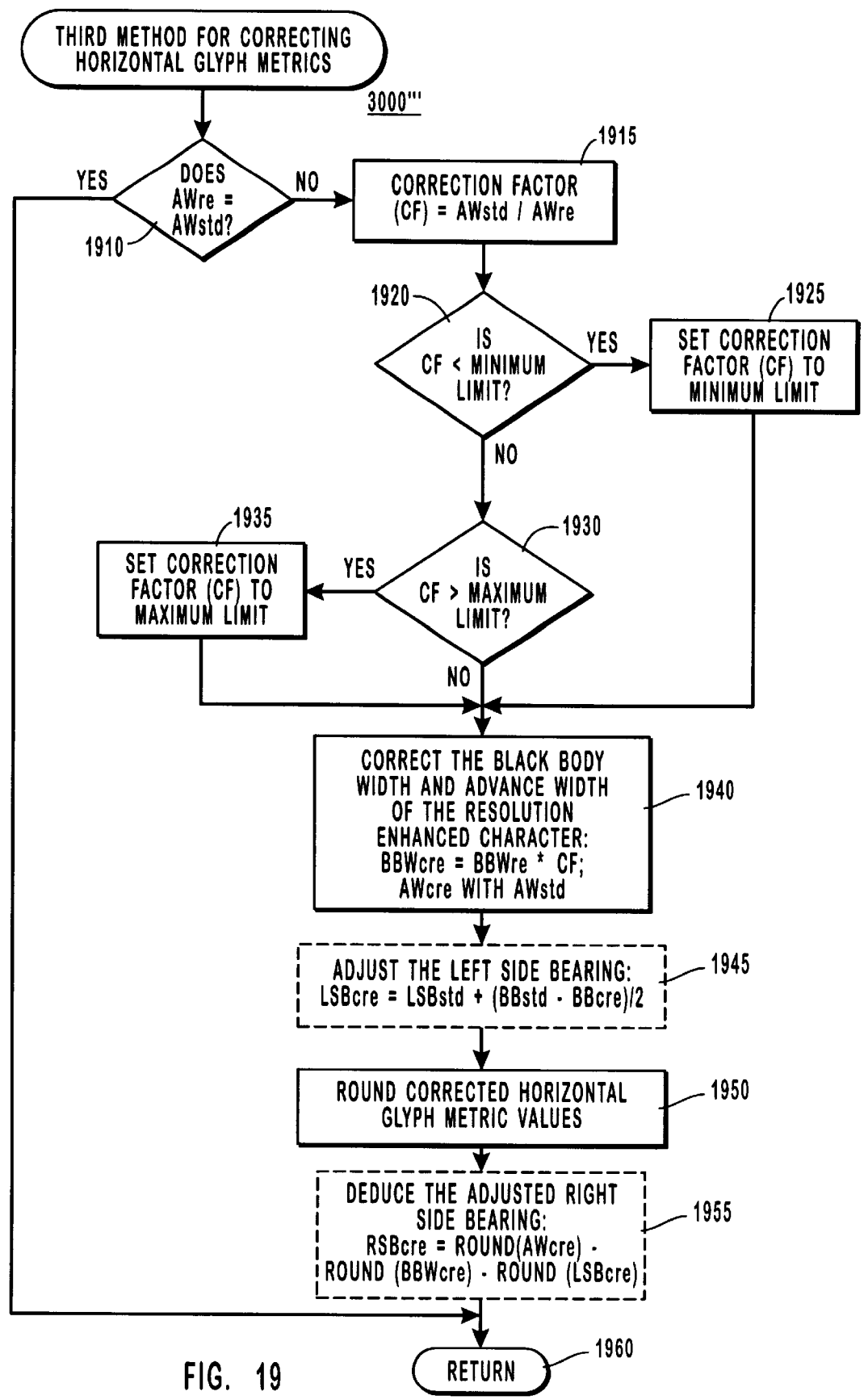
FIG. 19 is a flow diagram of a third exemplary method which may be used to practice at least one aspect of the present invention.

FIG. 19 is a flow diagram of a third exemplary method 3000‴ which may be used to effect the horizontal glyph metric correction process 3000. Basically, this method limits the amount of stretching or compression of the character outline. As shown at decision branch point 1910, it is determined whether or not the advance width of the enhanced resolution character ($AW_{re}$) equals the advance width of the standard character ($AW_{std}$). If so, the method 3000‴ is left via RETURN node 1960. If, on the other hand, the advance width of the enhanced resolution character ($AW_{re}$) does not equal the advance width of the standard character ($AW_{std}$), the method branches to act 1915 where a correction factor is set to the advance width of the standard character divided by the advance width of the resolution enhanced character (that is, $CF=AW_{std}/AW_{re}$). The method 3000‴ then continues to decision branch point 1920 where it is determined whether the correction factor is less than a predetermined minimum correction factor value. If so, as shown in act 1925, the correction factor is set to the minimum correction factor value and the method continues to act 1940. It has been determined that setting the predetermined minimum value to 0.8 provides good results. Minimum values close to 0.8 also provide good results.

Referring, once again, to decision branch point 1920, if it is determined that the correction factor is not less than the minimum correction factor, then the method 3000‴ branches to decision branch point 1930 where it is determined whether the correction factor is greater than a predetermined maximum correction factor value. If so, as shown in act 1935, the correction factor is set to the maximum correction factor value. It has been determined that setting the predetermined maximum value to 1.2 provides good results. Maximum values close to 1.2 also provide good results. The method 3000‴ then continues to act 1940. Referring back to decision branch point 1930, if the correction factor was not greater than the predetermined maximum correction factor, then the method 3000‴ continues directly to act 1940.

At act 1940, the advance width of the resolution enhanced character set to that of the standard character. Further, the black body width of the resolution enhanced character ($BBW_{re}$) is stretched or compressed. This stretching or compressing may be done linearly based on the correction factor, as limited if necessary (that is, $BBW_{cre}=BBW_{re}*CF$) When implementing the stretching or compressing of the character outline in act 1940, the point defining (i.e., X coordinates of) the character outline are actually scaled based on the correction factor. The method 3000‴ may then be left via RETURN node 1995.

In an alternative embodiment in which the method 3000″ further shifts the stretched or compressed character to the left or right, respectively, optional acts 1945, 1950 and 1955 may be effected. As shown in step 1950, the left side bearing of the resolution enhanced character may be determined as follows:

$$LSB_{cre}=LSB_{std}+(BBW_{std}-BBW_{cre})/2.$$

The right side bearing may be similarly corrected. However, since the corrected advance width, black body width and left side bearing may all be rounded, as shown in act 1950, the corrected right side bearing may be deduced from the other horizontal glyph metrics as follows:

$$RSB_{cre}=\text{round }(AW_{cre})-\text{round}(BBW_{cre})-\text{round}(LSB_{cre}),$$

as shown in act 1955. The method 3000‴ is then left via RETURN node 1960.

Figure 20:
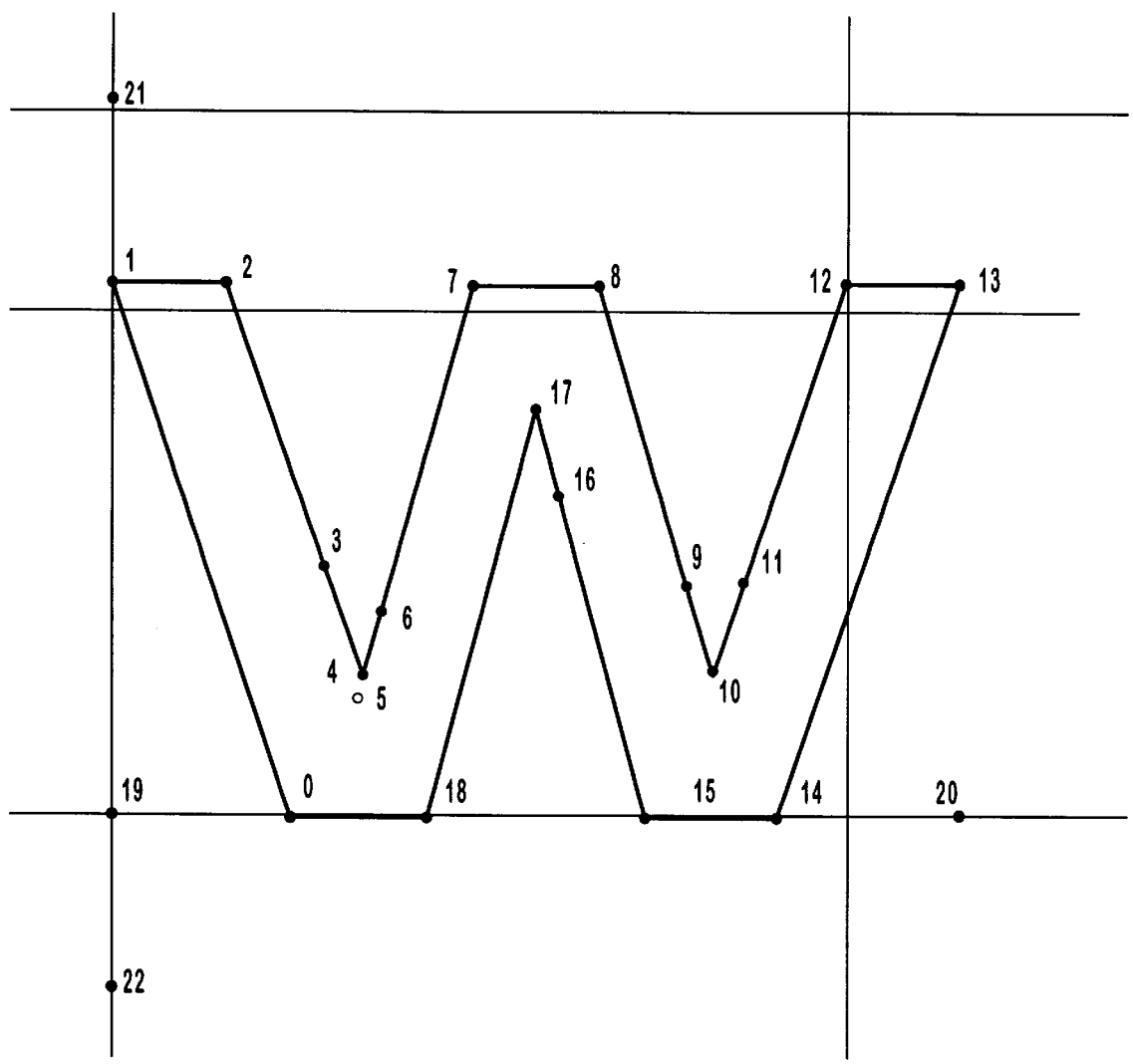
FIG. 20 illustrates a "w" character outline, rendered using the third exemplary method of FIG. 19.
Figure 21:
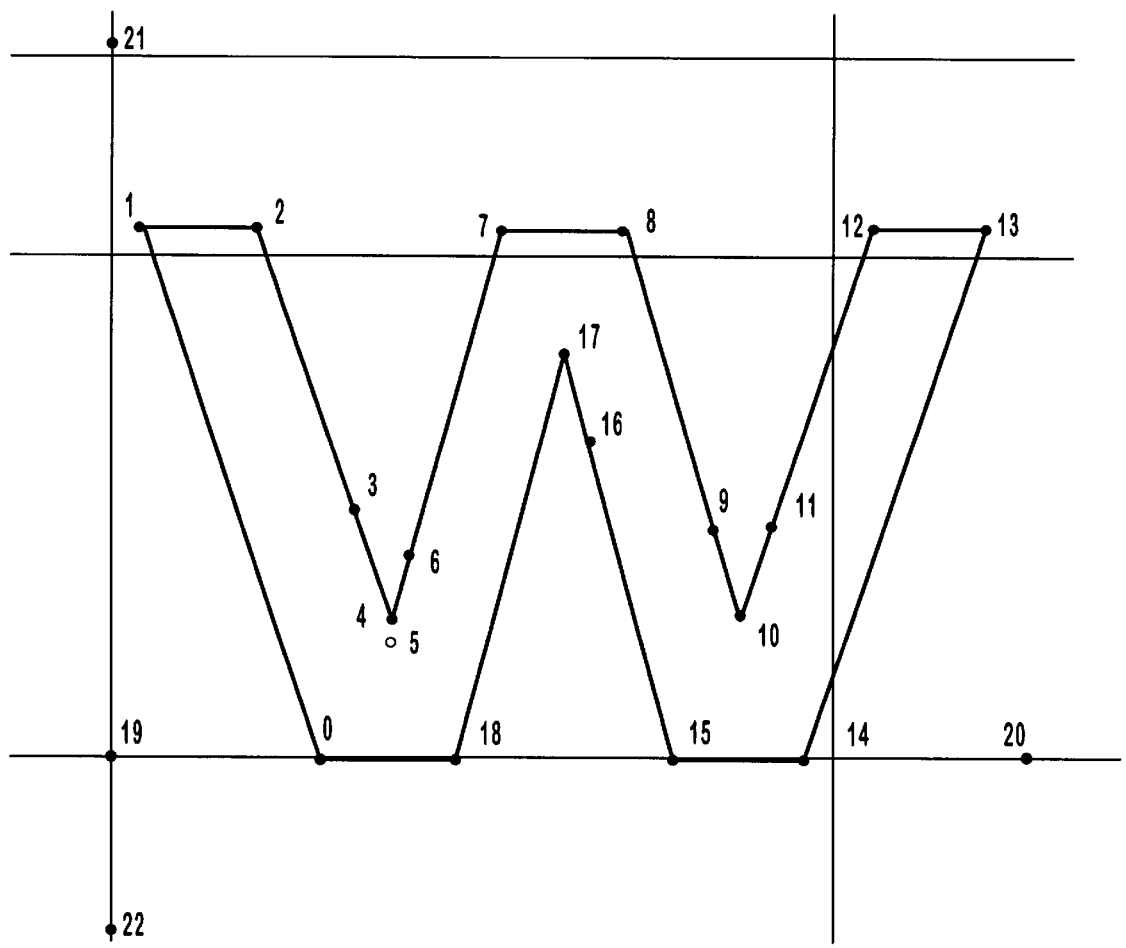
FIG. 21 illustrates a "w" character outline, rendered using the third exemplary method of FIG. 19.
Figure 22:
FIG. 22 illustrates an example of text that results when using the third exemplary method of FIG. 19.

FIG. 20 illustrates a "w" character outline, rendered using the third exemplary method 3000‴ of FIG. 19 without correcting the left and right side bearing values. FIG. 21 illustrates a "w" character outline, rendered using the third exemplary method of FIG. 19 in which the left and right side bearings are corrected. Comparing FIGS. 21 and 20, notice that the left side bearing (that is, a space between the left vertical line and the character outline) was increased. FIG. 22 illustrates an example of text that results when using the third exemplary method of FIG. 19 when the left and right side bearings are corrected. Notice that the "w" is roughly centered between the adjacent "e" and "s".

§ 4.3.2.4 Fourth Exemplary Method

Figure 24:
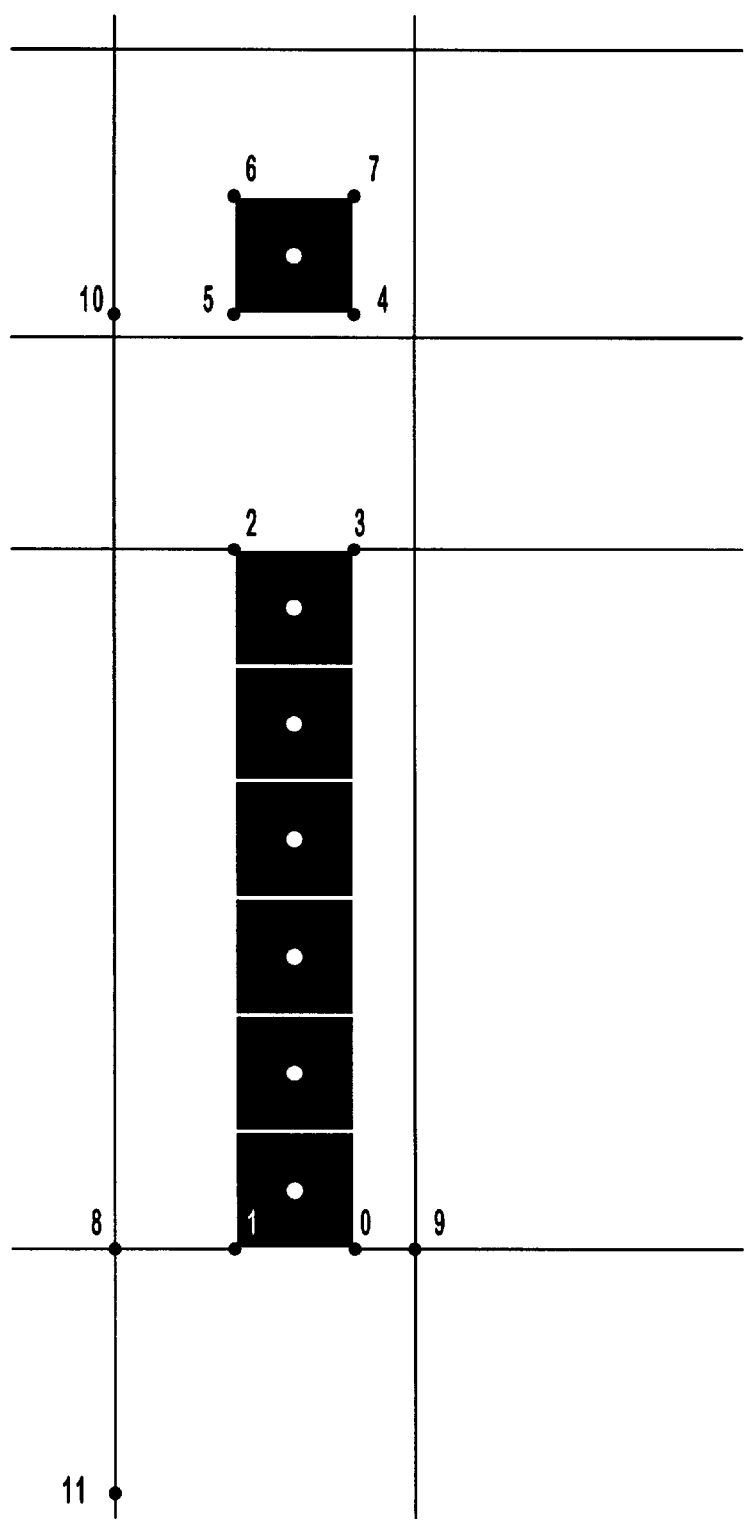
FIG. 24 illustrates the letter "i", with hinting applied.

FIG. 23 is an example which illustrates a problem that occurs with mono-stem characters, when using the third exemplary method of FIG. 20. More specifically, mono-stem characters, such as "i" and "l" for example, can often become too thin or too thick. A cause of this problem is illustrated in the following example. FIG. 24 illustrates the letter "i", with hinting applied, but without resolution enhancement. This character has a left side bearing of one (1) pixel, a black body width of one (1) pixel, and an advance width of two (2) pixels.

Figure 25:
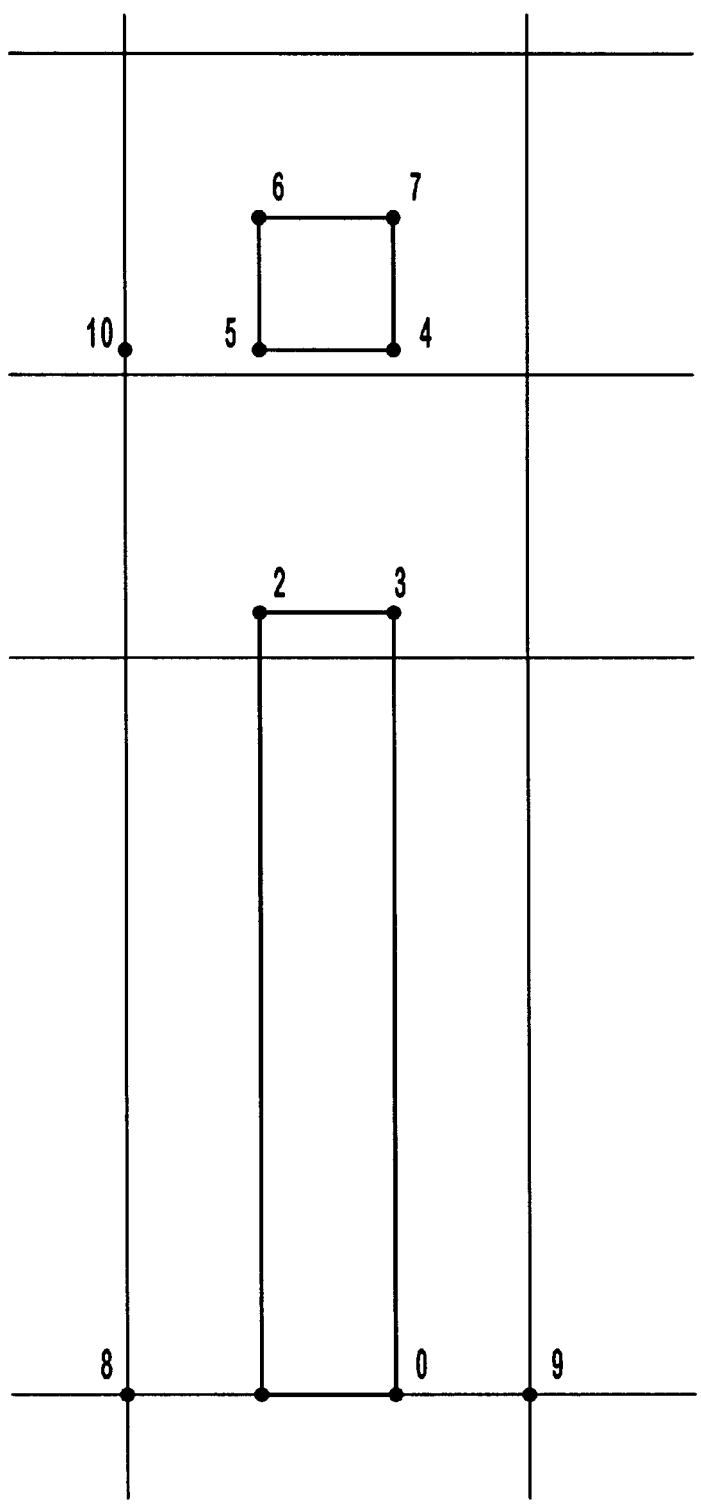
FIG. 25 illustrates sub-pixel components defining the letter "i", with hinting.

FIG. 25 illustrates sub-pixel components defining the letter "i", with hinting. Notice that this resolution enhanced "i" as a black body width of one (1) pixel but an advance width of three (3) pixels. Using the method 3000″ of FIG. 16, the correction ratio (that is $AW_{std}/AW_{re}$) is 2/3 (=0.667). Even if this correction ratio is limited to 0.8 in accordance with the method 3000''' of FIG. 19, the resulting character is still too thick. A fourth exemplary method 3000'''' of the present invention addresses this problem.

FIG. 26, which includes FIGS. 26A and 26B, is a flow diagram of an exemplary method 3000'''' which may be used to effect the horizontal glyph metric correction process 3000. This exemplary method 3000'''' applies special processing for mono-stem characters. Basically, this special processing is applied when the black body width of the standard character is less than or equal to one (1) pixel. The special processing scales the character by a correction ratio of the black body widths (that is, $BBW_{std}/BBW_{re}$), rather than by a correction ratio of the advance widths (that is $AW_{std}/AW_{re}$).

Initially, the standard and resolution enhanced (horizontal) glyph metrics are determined and/or accepted as shown in acts 2605 and 2610. The advance width values are rounded to the nearest pixel as shown in act 2615. At decision branch point 2620, it is determined whether or not the advance width of the resolution enhanced character ($AW_{re}$) equals the advance width of the standard character ($AW_{std}$). If so, the method 3000'''' continues, via node B 2645, to act 2685 where values are rounded. If not, to the method 3000'''' continues to decision branch point 2625 where it is determined whether or not to apply the special mono-stem processing. This determination can be made by determining whether or not the rounded black body width of the standard character is less than or equal to one (1) (that is, if $BBW_{std} \leq 1$). If so, the correction ratio (CORRECTION) is set to the ratio of the black body widths of the standard and resolution enhanced characters (that is, $BBW_{std}/BBW_{re}$) as shown in act 2630. The method 3000'''' then proceeds to node A 2640. If the rounded black body width of the standard character is greater than one (1) (that is, if $BBW_{std} > 1$), then the correction ratio (CORRECTION) is set to the ratio of the advance widths of the standard and resolution enhanced characters (that is, $AW_{std}/AW_{re}$) as shown in step 2635. The method 3000'''' then proceeds to node A 2640.

Thus far, the correction ratio has been determined and the special challenge arising with mono-stem characters has been accounted for. The correction ratio is then limited, if necessary, as described below. From node A 2740, the method 3000'''' proceeds to decision branch point 2650 where it is determined whether or not the correction factor (CORRECTION) is less than a minimum limit (e.g., 0.8). If so, the correction factor (CORRECTION) is set to the minimum limit (e.g., 0.8) as shown in act 2655 and the method continues to act 2670. If, on the other hand, the correction factor (CORRECTION) is not less than the minimum limit (e.g., 0.8), the method 3000'''' proceeds to decision branch point 2660 where it is determined whether or not the correction factor (CORRECTION) is greater than a maximum limit (e.g., 1.2). If so, the correction factor (CORRECTION) is set to the maximum limit (e.g., 1.2) as shown in step 2665 and the method 3000'''' continues to act 2670. If, on the other hand, the correction factor (CORRECTION) is not greater than the maximum limit (e.g., 1.2), the method 3000'''' proceeds to act 2670 directly.

Thus, the correction ratio has been determined and, if necessary, limited. Now, the correction ratio is applied. Referring to act 2670, the correction factor (CORRECTION) is applied to the resolution enhanced (horizontal) glyph metrics. That is:

$$LSB_{cre} = LSB_{re} \cdot (CORRECTION).$$

The black body width ($BBW_{re}$) will also effectively change (to $BBW_{cre}$). This is a consequence of scaling each of the (X) coordinates of the points defining the character outline by the correction factor (CORRECTION). The corrected right side bearing may be defined as follows:

$$RSB_{cre} = AW_{cre} - BBW_{cre} - LSB_{cre}.$$

As was always the case, the advance width of the resolution enhanced character is simply set to that of the standard character (that is, $AW_{cre} = AW_{std}$) as shown in act 2675. The character may be centered, as was the case in the method 3000''' of FIG. 19, as shown in act 2675. That is, if the black body width was compressed or stretched, then the left side bearing and the right side bearing may be adjusted as follows;

$$LSB_{cre'} = LSB_{cre} + (AW_{std} - AW_{cre})/2;$$

and $$RSB_{cre'} = RSB_{cre} + (AW_{std} - AW_{cre})/2.$$

The final advance width ($AW_{cre'}$) is simply the same as the corrected advance width ($AW_{cre}$), which was set to the advance width of the standard character ($AW_{std}$). The values may then be rounded to the nearest sub-pixel component value in act 2685. In an alternative method, if the final corrected right side bearing ($RSB_{cre'}$) was not determined in act 2680, then the right side bearing may be deducted from the other rounded horizontal glyph metrics as follows:

$$RSB_{cre'} = \text{round}(AW_{cre'}) - \text{round}(BBW_{cre'}) - \text{round}(LSB_{cre'}),$$

as shown in act 2690. The method 3000'''' is then left via RETURN node 2695.

FIG. 27 illustrates the letter "i" rendered in accordance with the exemplary method of claim 26. FIG. 28 illustrates the text of FIG. 23, when rendered in accordance with the exemplary method of claim 27. Notice that the monostem characters "i" and "l" do not appear to be too thick or too thin.

§ 4.4 Conclusions

Thus, the present invention may be used to adjust the widths of characters, that have had (or are having) resolution enhancement processing applied, so that the widths of the characters are maintained. In this way, formatting of any filed including such characters is maintained. The present invention may further be used to minimize a non-uniformity of gaps between characters. The present invention may also minimize a non-uniformity in the weight of character lines.

Although this invention has been described in the context of resolution enhanced text on vertically striped patterned displays, its teachings can be easily applied to vertical glyph metrics in the context of characters (such as Asian characters for example) to be displayed at an enhanced resolution on horizontally striped patterned displays.

What is claimed is:

1. In a rendering system that processes characters having existing formatting associated with a pixel precision resolution and renders the characters at a sub-pixel precision resolution, a method for rendering the characters at the sub-pixel precision resolution while maintaining the layout of a document that includes the characters when the characters are rendered at the sub-pixel precision resolution, the method comprising:

obtaining a document having a layout associated with pixel precision resolution, the document including characters having a particular font and a particular point size and having pixel precision advance widths and pixel precision black body widths associated with the pixel precision resolution;

in preparation for displaying the document on a display device that is capable of displaying the characters with sub-pixel precision resolution, hinting the characters to pixel sub-component boundaries without changing the particular font or the particular point size, thereby:
changing the pixel precision black body widths to resolution enhanced black body widths associated with the sub-pixel precision resolution; and
changing the pixel precision advance widths to resolution enhanced advance widths associated with the sub-pixel precision resolution, at least some of the resolution enhanced advance widths being different from the corresponding pixel precision advance widths;
replacing said at least some of the resolution enhanced advance widths with the corresponding pixel precision advance widths, thereby maintaining the layout of the document as the layout existed prior to the act of hinting; and
displaying the document on the display device, wherein the displayed document includes the hinted characters and further has the layout as the layout existed prior to the act of hinting.

2. The method of claim 1, further comprising, after the act of hinting, the act of adjusting the resolution enhanced black body width of each of a plurality of characters based on the resolution enhanced advance width of the character and the pixel precision advance width of the character.

3. The method of claim 2, wherein the act of adjusting the resolution enhanced black body width of each of the plurality of characters is performed by scaling points defining an outline of the character by a ratio of the pixel precision advance width of the character to the resolution enhanced advance width of the character.

4. The method of claim 3 wherein each of the points defining the outline of the character are scaled by scaling an X coordinate of the character.

5. The method of claim 2, wherein the act of adjusting the resolution enhanced black body width of each of a plurality of characters is performed by multiplying the resolution enhanced black body width of the character by a correction factor defined by the pixel precision advance width of the character divided by the resolution enhanced advance width of the character, wherein limiting the correction factor is limited if the correction factor would otherwise be greater than a predetermined maximum limit.

6. The method of claim 5 wherein the predetermined maximum limit is approximately 1.2.

7. The method of claim 2, wherein the act of adjusting the resolution enhanced black body width of each of the plurality of characters is performed by multiplying the resolution enhanced black body width of the character by a correction factor defined by the pixel precision advance width of the character divided by the resolution enhanced advance width of the character, wherein limiting the correction factor is limited if the correction factor would otherwise be less than a predetermined minimum limit.

8. The method of claim 7 wherein the predetermined minimum limit is approximately 0.8.

9. The method of claim 2, further comprising, prior to the act of displaying the document, the act of moving the black body of a particular character to the left if the resolution enhanced black body width of the particular character is greater than the pixel precision black body width of the particular character.

10. The method of claim 9, wherein the act of moving the black body of the particular character comprises the act of decreasing a left side bearing metric associated with the particular character.

11. The method of claim 10, wherein the act of decreasing the left side bearing metric is performed by decreasing the left side bearing by one half of a difference between the pixel precision black body width of the particular character and the resolution enhanced black body width of the particular character.

12. The method of claim 2, further comprising, prior to the act of displaying the document, the act of moving the black body of a particular character to the right if the resolution enhanced black body width of the particular character is less than the pixel precision black body width of the particular character.

13. The method of 12, wherein the act of moving the black body of the particular character comprises the act of increasing a left side bearing metric associated with the particular character.

14. The method of claim 13, wherein the act of increasing the left side bearing metric is performed by increasing the left side bearing by one half of a difference between the pixel precision black body width of the particular character and the resolution enhanced black body width of the particular character.

15. In a rendering system that processes characters having existing formatting associated with a pixel precision resolution and renders the characters at a sub-pixel precision resolution, a method for rendering the characters at the sub-pixel precision resolution while maintaining the layout of a document that includes the characters when the characters are rendered at the sub-pixel precision resolution, the method comprising:
obtaining a document having a layout associated with pixel precision resolution, the document including characters having a particular font and a particular point size and having pixel precision advance widths and pixel precision black body widths associated with the pixel precision resolution;
in preparation for displaying the document on a display device that is capable of displaying the characters with sub-pixel precision resolution, hinting the characters to pixel sub-component boundaries without changing the particular font or the particular point size, thereby:
changing the pixel precision black body widths to resolution enhanced black body widths associated with the sub-pixel precision resolution; and
changing the pixel precision advance widths to resolution enhanced advance widths associated with the sub-pixel precision resolution; for each of a plurality of the characters in the document, performing the acts of:
determining whether the character is a mono-stem character;
replacing the advance width of the character with the pixel precision advance width of the character that existed prior to the act of hinting, thereby maintaining the layout of the document as the layout existed prior to the act of hinting; and
adjusting the resolution enhanced black body width of the character, wherein:
if it is determined that the character is not a mono-stem character, then the act of adjusting the resolution enhanced black body width of the character comprises multiplying the resolution enhanced black body width of the character by a correction factor defined by the pixel precision advance width of the character divided by the resolution enhanced advance width of the character; and if it is determined that the character is a mono-stem character, then the act of adjusting the resolution enhanced black body width of the character comprises multiplying the resolution enhanced black body width by a correction factor defined by the pixel precision black body width of the character divided by the resolution enhanced black body width of the character; and displaying the document on the display device, wherein the displayed document includes the hinted characters and further has the layout as the layout existed prior to the act of hinting.

16. The method of claim 15, wherein the act of determining whether the character is a mono-stem character comprises the act of determining whether the pixel precision black body width of the character is no greater than one.

17. A rendering apparatus for processing characters having existing formatting associated with a pixel precision resolution and rendering the characters at a sub-pixel precision resolution while maintaining the layout of a document that includes the characters when the characters are rendered at the sub-pixel precision resolution, the apparatus comprising:

means for obtaining a document having a layout associated with pixel precision resolution, the document including characters having a particular font and a particular point size and having pixel precision advance widths and pixel precision black body widths associated with the pixel precision resolution;

means for hinting the characters to pixel sub-component boundaries without changing the particular font or the particular point size in preparation for displaying the document on a display device that is capable of displaying the characters with sub-pixel precision resolution, thereby:

changing the pixel precision black body widths to resolution enhanced black body widths associated with the sub-pixel precision resolution; and changing the pixel precision advance widths to resolution enhanced advance widths associated with the sub-pixel precision resolution, at least some of the resolution enhanced advance widths being different from the corresponding pixel precision advance widths;

means for replacing said at least some of the resolution enhanced advance widths with the corresponding pixel precision advance widths, thereby maintaining the layout of the document as the layout existed prior to the act of hinting; and means for displaying the document on the display device, wherein the displayed document includes the hinted characters and further has the layout as the layout existed prior to the act of hinting.

18. The apparatus of claim 17, further comprising means for adjusting the resolution enhanced black body width of each of a plurality of characters based on the resolution enhanced advance width of the character and the pixel precision advance width of the character.

19. The rendering apparatus of claim 18, wherein the means for adjusting the resolution enhanced black body width of each of the plurality of characters comprises means for multiplying the resolution enhanced black body width of the character by a correction factor defined by the pixel precision advance width of the character divided by the resolution enhanced advance width of the character, wherein means for limiting the correction factor is limited if the correction factor would otherwise be greater than a predetermined maximum limit.

20. The apparatus of claim 18, wherein the means for adjusting the resolution enhanced black body width of each of the plurality of characters comprises means for multiplying the resolution enhanced black body width of the character by a correction factor defined by the pixel precision advance width of the character divided by the resolution enhanced advance width of the character, wherein the correction factor is limited if the correction factor would otherwise be less than a predetermined minimum limit.

21. The apparatus of claim 18, further means for moving the black body of a particular character to the left prior to displaying the document if the resolution enhanced black body width of the particular character is greater than the pixel precision black body width of the particular character.

22. The apparatus of claim 18, further means for moving the black body of a particular character outline to the right prior to displaying the document if the resolution enhanced black body width of the particular character is less than the pixel precision black body width of the particular character.

23. A rendering apparatus for processing characters having existing formatting associated with a pixel precision resolution and for rendering the characters at a sub-pixel precision while maintaining the layout of a document that includes the characters when the characters are rendered at the sub-pixel precision resolution, the apparatus comprising:

means for obtaining a document having a layout associated with pixel precision resolution, the document including characters having a particular font and a particular point size and having pixel precision advance widths and pixel precision black body widths associated with the pixel precision resolution;

means for hinting the characters to pixel sub-component boundaries without changing the particular font or the particular point size in preparation for displaying the document on a display device that is capable of displaying the characters with sub-pixel precision resolution, thereby:

changing the pixel precision black body widths to resolution enhanced black body widths associated with the sub-pixel precision resolution; and changing the pixel precision advance widths to resolution enhanced advance widths associated with the sub-pixel precision resolution; means for performing, for each of a plurality of the characters in the document, the functions of:

determining whether the character is a mono-stem character;

replacing the advance width of the character with the pixel precision advance width of the character that existed prior to hinting, thereby maintaining the layout of the document as the layout existed prior to hinting; and adjusting the resolution enhanced black body width of the character, wherein:

if it is determined that the character is not a mono-stem character, then the means for adjusting the resolution enhanced black body width of the character multiplies the resolution enhanced black body width of the character by a correction factor defined by the pixel precision advance width of the character divided by the resolution enhanced advance width of the character; and if it is determined that the character is a mono-stem character, then the means for adjusting the resolution enhanced black body width of the character multiplies the resolution enhanced black body width by a correction factor defined by the pixel precision black body width of the character divided by the resolution enhanced black body width of the character; and means for displaying the document on the display device, wherein the displayed document includes the hinted characters and further has the layout as the layout existed prior to hinting.

* * * * *

UNITED STATES PATENT AND TRADEMARK OFFICE
CERTIFICATE OF CORRECTION

PATENT NO. : 6,282,327 B1 Page 1 of 1
APPLICATION NO. : 09/364364
DATED : August 28, 2001
INVENTOR(S) : Claude Betrisey and Bodin Dresevic It is certified that error appears in the above-identified patent and that said Letters Patent is hereby corrected as shown below:

Col. 5, ln. 23: change "(=211)" to --(=2")--

Col. 7, ln. 42: change "uints" to --units--

Col. 21, ln. 35: after "3" insert --,--

Col. 21, ln. 36: change "arc" to --are--

Col. 21, ln. 44: after "wherein" delete [limiting]

Col. 21, ln. 55: after "wherein" delete [limiting]

Col. 22, ln. 4: after "bearing" delete [metric]

Col. 22, ln. 20: after "bearing" delete [metric]

Col. 24, ln. 6: after "wherein" delete [means for limiting]

Col. 24, ln. 18: after "further" insert --comprising--

Col. 24, ln. 24: after "further" insert --comprising--

Col. 24, ln. 25: after "character" delete [outline]

Signed and Sealed this

Third Day of June, 2008

JON W. DUDAS
*Director of the United States Patent and Trademark Office*